(12) United States Patent
Muramatsu et al.

(10) Patent No.: US 8,371,758 B2
(45) Date of Patent: *Feb. 12, 2013

(54) ROLLING CONTACT MEMBER AND ROLLING BEARING

(75) Inventors: Katsutoshi Muramatsu, Kuwana (JP); Masaaki Honda, Kuwana (JP); Hikaru Ishida, Kuwana (JP); Nobuyuki Ninoyu, Kuwana (JP)

(73) Assignee: NTN Corporation, Osaka-Shi (JP)

( * ) Notice: Subject to any disclaimer, the term of this patent is extended or adjusted under 35 U.S.C. 154(b) by 313 days.

This patent is subject to a terminal disclaimer.

(21) Appl. No.: 12/738,517

(22) PCT Filed: Oct. 16, 2008

(86) PCT No.: PCT/JP2008/068771
§ 371 (c)(1),
(2), (4) Date: Apr. 16, 2010

(87) PCT Pub. No.: WO2009/051189
PCT Pub. Date: Apr. 23, 2009

(65) Prior Publication Data
US 2010/0215305 A1 Aug. 26, 2010

(30) Foreign Application Priority Data

Oct. 18, 2007 (JP) .................. 2007-271232
Nov. 2, 2007 (JP) .................. 2007-286502

(51) Int. Cl.
*F16C 33/62* (2006.01)

(52) U.S. Cl. ..................... 384/492; 384/907.1

(58) Field of Classification Search .................. 384/492, 384/279, 907.1
See application file for complete search history.

(56) References Cited

U.S. PATENT DOCUMENTS

| | | | |
|---|---|---|---|
| 4,127,416 A | 11/1978 | Lumby et al. | |
| 4,280,973 A | 7/1981 | Moskowitz et al. | |
| 5,538,558 A | 7/1996 | Ookouchi et al. | |
| 5,718,519 A | 2/1998 | Ookouchi et al. | |

(Continued)

FOREIGN PATENT DOCUMENTS

| CN | 1534212 A | 10/2004 |
|---|---|---|
| CN | 2799293 Y | 7/2006 |

(Continued)

OTHER PUBLICATIONS

Chinese Office Action, w/ English translation thereof, issued in Chinese Patent Application No. CN 200880112439.6 dated Feb. 14, 2012.

(Continued)

*Primary Examiner* — Thomas R Hannon
(74) *Attorney, Agent, or Firm* — McDermott Will & Emery LLP

(57) ABSTRACT

Each of an outer ring, an inner ring, and a ball is a rolling contact member formed of a β-sialon sintered body inexpensive, capable of reliably ensuring sufficient durability, and capable of being used in an application where an imposed load is changed abruptly. The sintered body contains as a main component β-sialon represented by a compositional formula of $Si_{6-z}Al_zO_zN_{8-z}$ and satisfying $0.1 \leq z \leq 3.5$, and has a remainder formed of an impurity. The rolling contact member has a Young's modulus of 180 GPa or greater but 270 GPa or smaller.

10 Claims, 11 Drawing Sheets

U.S. PATENT DOCUMENTS

| | | | |
|---|---|---|---|
| 5,965,471 | A | 10/1999 | Brandt et. al. |
| 6,043,176 | A | 3/2000 | Brandt et. al. |
| 2002/0003228 | A1* | 1/2002 | Niwa et al. .......... 252/516 |
| 2005/0224763 | A1 | 10/2005 | Komatsu et al. |
| 2008/0159905 | A1 | 7/2008 | Watanabe et al. |
| 2009/0023577 | A1 | 1/2009 | Oda |
| 2010/0022313 | A1 | 1/2010 | Muramatsu |
| 2010/0189385 | A1 | 7/2010 | Muramatsu |

FOREIGN PATENT DOCUMENTS

| | | |
|---|---|---|
| DE | 39 38 644 A1 | 5/1990 |
| DE | 197 46 286 A1 | 4/1999 |
| EP | 0 556 833 A1 | 8/1993 |
| EP | 1 829 844 A1 | 9/2007 |
| EP | 2123924 A1 | 11/2009 |
| JP | 58-52949 (B) | 11/1983 |
| JP | 59-199581 (A) | 11/1984 |
| JP | 4-290613 | 10/1992 |
| JP | 5-096486 U | 12/1993 |
| JP | 10-36174 (A) | 2/1998 |
| JP | 2000-009146 A | 1/2000 |
| JP | 2001-192258 (A) | 7/2001 |
| JP | 2001-294478 | 10/2001 |
| JP | 2002-295477 (A) | 10/2002 |
| JP | 2003-013965 A | 1/2003 |
| JP | 2003-322154 A | 11/2003 |
| JP | 2004-091272 | 3/2004 |
| JP | 2005-075652 | 3/2005 |
| JP | 2005-194154 | 7/2005 |
| JP | 2007-132486 | 5/2007 |
| JP | 2007-182334 | 7/2007 |
| JP | 2008-162851 | 7/2008 |
| JP | 2009-008228 A | 1/2009 |
| WO | WO 2006/057232 A1 | 6/2006 |
| WO | WO-2008/075535 A1 | 6/2008 |

OTHER PUBLICATIONS

United States Office Action issued in U.S. Appl. No. 12/666,217 dated May 10, 2012.

European Search Report issued in European Patent Application No. 08764906.7-1523, mailed May 19, 2011.

Chinese Office Action, with English translation thereof, issued in Chinese Patent Application No. 200880022409.6, dated Jun. 24, 2011.

Extended European Search Report, issued in European Patent Application No. 09 766 674.7, dated Dec. 29, 2011.

United States Office Action issued in U.S. Appl. No. 13/233,683 dated Jan. 30, 2012.

United States Office Action issued in U.S. Appl. No. 13/233,683 dated May 17, 2012.

Chinese Office Action issued in Chinese Patent Application No. CN 20111033226.8 dated May 2, 2012.

United States Office Action issued in U.S. Appl. No. 12/520,430 dated Sep. 27, 2011.

United States Office Action issued in U.S. Appl. No. 12/520,430 dated Mar. 28, 2012.

United States Notice of Allowance issued in U.S. Appl. No. 12/520,430 dated Jul. 12, 2012.

English Language Translation of Japanese Office Action issued in Japanese Patent Application No. 2007-169462, mailed Oct. 27, 2009.

European Search Report issued in European Patent Application No. 07 83 2483, mailed Jan. 26, 2011.

Chinese Office Action, w/ English translation thereof, issued in Chinese Patent Application No. CN 200780047380.2 dated Sep. 10, 2010.

Chinese Office Action, w/English Translation thereof issued in Chinese Patent No. 200980123538.9 dated Sep. 29, 2012.

Japanese Office Action, w/English Translation thereof issued in Japanese Patent No. 2007-169462 dated Oct. 2, 2012.

Japanese Office Action, w/English Translation thereof issued in Japanese Patent No. 2007-169463 dated Oct. 16, 2012.

Japanese Office Action, w/English Translation thereof issued in Japanese Patent No. 2007-172323 dated Oct. 16, 2012.

Japanese Office Action, w/English Translation thereof issued in Japanese Patent No. 2007-172337 dated Oct. 16, 2012.

Japanese Office Action, w/English Translation thereof issued in Japanese Patent No. 2007-172890 dated Oct. 16, 2012.

United States Notice of Allowance issued in U.S. Appl. No. 13/233,683 dated Sep. 25, 2012.

Watanabe, Outline and Future Prospect of Mass Production by Direct Synthesis of Ultrafine Powdery Meramix w/full English translation, pp. 99-102.

* cited by examiner 0.2mm

ROLLING CONTACT MEMBER AND ROLLING BEARING

RELATED APPLICATIONS

This application is the U.S. National Phase under 35 U.S.C. §371 of International Application No. PCT/JP2008/068771, filed on Oct. 16, 2008, which in turn claims the benefit of Japanese Application Nos. 2007-271232, filed on Oct. 18, 2007 and 2007-286502, filed on Nov. 2, 2007, the disclosures of which applications are incorporated by reference herein.

TECHNICAL FIELD

The present invention relates to a rolling contact member and a rolling bearing, more particularly, a rolling contact member formed of a sintered body containing β-sialon as a main component and a rolling bearing including the rolling contact member.

BACKGROUND ART

Silicon nitride, sialon and similar ceramics characteristically not only have a smaller specific gravity and are more corrosive-resistant than steel but are also insulating. Accordingly, if ceramics are adopted as a material for a rolling contact member that is a component of rolling bearings (including hub units) each including a race member and a rolling element, for example, are adopted as a material for the race member and the rolling element, they can provide bearings and the like reduced in weight and also prevent rolling bearings from having short lives as their components corrode and are thus damaged or electrolytically corrode.

Furthermore, a hub unit, which is a type of rolling bearing, is often used in an environment having a possibility of receiving moisture therein and hence having insufficient lubricity. Ceramic rolling elements, race members and similar rolling contact components are characteristically less damageable in such an insufficiently lubricating environment as above. Accordingly, for example, a hub unit with a rolling contact component formed with ceramics adopted as a material can exhibit improved durability when it is employed in an insufficiently lubricating environment.

Meanwhile, in a wind turbine generator, rotation of a main shaft connected to a blade, which is rotated by force of wind, is speeded up by a step-up gear box and is transmitted to an output shaft. Accordingly, the output shaft is rotated, which causes rotation of a rotor of a power generator, thereby generating electric power. Here, to attain improved efficiency in power generation, a demand arises for weight reduction of rolling bearings for such a wind turbine generator. The rolling bearings for a wind turbine generator include: a main shaft bearing for supporting the main shaft of a windmill used for the wind turbine generator; a power generator bearing for rotatably supporting a rotation member, which rotates according to rotation of the main shaft, such as a rotor shaft connected to the rotor of the power generator, relative to a member disposed opposite to the rotor shaft; a step-up gear box bearing for rotatably supporting the rotating shaft, which rotates in an inner portion of the step-up gear box, relative to a member disposed opposite to the rotating shaft; and the like. Further, such rolling bearings for the wind turbine generator operate depending on increase/decrease of force of wind, and speed of rotation is therefore greatly increased/decreased. As a result, lubricity is likely to be insufficient. Further, the rolling bearings for a wind turbine generator are occasionally installed in locations in which it is difficult to do maintenance of the rolling bearings. Accordingly, a demand arises in maintenance-free rolling bearings. High durability is required in an environment of insufficient lubricity.

Further, in the power generator, current may flow in the inner portion of the power generator bearing due to its device structure. Furthermore, wind turbine generators, which are usually installed at a high altitude, may be struck by lightning, which may cause current to flow in the inner portion of a rolling bearing for a wind turbine generator. The current flowing in the inner portion of the rolling bearing for a wind turbine generator causes generation of spark between a race member such as a bearing ring and a rolling element such as a ball or a roller, both of which are components of the rolling bearing for a wind turbine generator. This may result in generation of electrolytic corrosion. The electrolytic corrosion causes damage on a raceway surface of the race member or the rolling element, resulting in decreased life of the rolling bearing for a wind turbine generator.

As described above, as compared with steel, ceramics such as silicon nitride and sialon characteristically have a smaller specific gravity, are insulative, and are less likely to be damaged in an environment of insufficient lubricity. Hence, by employing such ceramics as materials for rolling contact members constituting a rolling bearing for a wind turbine generator such as a race member or a rolling element in the rolling bearing for a wind turbine generator, the weight of the bearing can be reduced and the decreased life resulting from electrolytic corrosion can be prevented, thus providing the rolling bearing for a wind turbine generator with a rolling contact member highly durable in an environment of insufficient lubricity.

However, silicon nitride, sialon and similar ceramics require higher production cost than steel, and adopting ceramics as a material for components of rolling contact members of rolling bearings disadvantageously increases their production costs.

In recent years, there has been developed a method of producing β-sialon, a type of ceramics, inexpensively by a production process including combustion synthesis (see Japanese Patent Laying-open No. 2004-91272 (Patent Document 1), Japanese Patent Laying-open No. 2005-75652 (Patent Document 2) and Japanese Patent Laying-open No. 2005-194154 (Patent Document 3) for example). This allows one to consider adopting β-sialon as a material for components of rolling bearings to produce them inexpensively.

Patent Document 1: Japanese Patent Laying-open No. 2004-91272
Patent Document 2: Japanese Patent Laying-open No. 2005-75652
Patent Document 3: Japanese Patent Laying-open No. 2005-194154

DISCLOSURE OF THE INVENTION

Problems to be Solved by the Invention

To adopt the above β-sialon as a material for a rolling contact member of a rolling bearing, however, the rolling contact member formed of β-sialon must have a sufficient rolling contact fatigue life. Rolling contact fatigue life does not necessarily match a member's fracture strength and the like, and it cannot be said that the rolling contact member formed of β-sialon necessarily has a sufficient rolling contact fatigue life. Thus it has not been easy either to ensure that a rolling bearing including a rolling contact member formed of β-sialon reliably has sufficient durability.

Further, when β-sialon, hardly deformed elastically, is adopted as a material for rolling contact members, pressure of contacted surface between a race member serving as a rolling contact member and a rolling element serving as a rolling contact member tends to be large. Hence, when rolling contact members each formed of β-sialon are adopted for rolling contact members of a bearing intended to be used in an application where an imposed load is changed abruptly, pressure on the contact surface between the rolling contact members exceeds a permissible value, whereby the rolling contact members may be damaged. As such, β-sialon may not be necessarily suitable for a material of rolling contact members intended to be used in an application where an imposed load is abruptly changed.

In particular, a windmill for power generation rotates according to force of wind. Hence, abrupt change in wind speed causes abrupt acceleration/deceleration of a rolling bearing for wind power generation. Accordingly, a load with great impact may be imposed on a rolling contact member constituting the rolling bearing for wind power generation. In addition, in the main shaft bearing, a great load may be imposed thereon in the axial direction as a result of occurrence of a gust of wind. Hence, when β-sialon is adopted as a material for rolling contact members for wind power generation and a great load is abruptly imposed on the rolling bearing for wind power generation as described above, pressure on the contact surface between the rolling contact members for wind power generation exceeds the permissible value, with the result that the rolling contact members may be damaged. Such problems, which are specific to the rolling contact members for wind power generation, need to be solved in adopting β-sialon as a material of rolling contact members for wind power generation.

An object of the present invention is to provide a rolling contact member formed of a β-sialon sintered body (a sintered body containing β-sialon as a main component) inexpensive, capable of reliably ensuring sufficient durability, and capable of being used in an application where an imposed load is changed abruptly, as well as a rolling bearing (including a hub unit) including such a rolling contact member.

Another object of the present invention is to provide a rolling contact member of a rolling bearing for a wind turbine generator, which is formed of a β-sialon sintered body inexpensive, capable of reliably ensuring sufficient durability, and capable of preventing damage when a great load is imposed abruptly, as well as the rolling bearing including the rolling contact member for a wind turbine generator.

Means for Solving the Problems

A rolling contact member of one aspect of the present invention is one of a race member and a rolling element disposed in contact with the race member on an annular raceway in a rolling bearing. The rolling contact member is formed of a sintered body that contains as a main component β-sialon represented by a compositional formula of $Si_{6-z}Al_zO_zN_{8-z}$ and satisfying $0.1 \leq z \leq 3.5$ and that has a remainder formed of an impurity, the rolling contact member having a Young's modulus of 180 GPa or greater but 270 GPa or smaller.

A rolling contact member of another aspect of the present invention is one of a race member and a rolling element disposed in contact with the race member on an annular raceway in a rolling bearing. The rolling contact member is formed of a sintered body that contains as a main component β-sialon represented by a compositional formula of $Si_{6-z}Al_zO_zN_{8-z}$ and satisfying $0.1 \leq z \leq 3.5$ and that has a remainder formed of a sintering additive and an impurity, the rolling contact member having a Young's modulus of 180 GPa or greater but 270 GPa or smaller.

The present inventor has investigated in detail a relationship between the rolling contact fatigue life of a rolling contact member containing β-sialon as a main component and the rolling contact member's configuration, and as a result obtained the following finding and arrived at the present invention.

Specifically, by employing a production process including combustion synthesis, β-sialons can be produced which has various compositions with values of z (hereinafter, referred to as "z value") of 0.1 or greater. On the other hand, hardness thereof, which has a great influence over rolling contact fatigue life, is generally hardly changed when the z value is in a range of 4.0 or smaller for easiness of production. It was found, however, that the rolling contact fatigue life of a rolling contact member formed of a sintered body containing β sialon as a main component was drastically decreased when the z value exceeds 3.5, as a result of a detailed investigation on a relationship between the rolling contact fatigue life of the rolling contact member and the z value.

More specifically, when the z value is in a range of 0.1 or greater but 3.5 or smaller, the rolling contact fatigue life is substantially the same. When time of operation of the rolling bearing exceeds a predetermined period of time, flakes come off on the surface of the rolling contact member, thus resulting in damage. On the other hand, when the z value exceeds 3.5, the rolling contact member is likely to be worn, thus resulting in drastically decreased rolling contact fatigue life. In other words, a mode of damage in the rolling contact member formed of β sialon is changed with the z value in the composition being 3.5 as a threshold. Namely, there was found such a phenomenon that the rolling contact fatigue life is decreased drastically when the z value exceeds 3.5. Hence, in order to reliably ensure a sufficient life of the rolling contact member formed of β sialon, the z value needs to be 3.5 or smaller.

Meanwhile, as described above, β-sialon can be produced inexpensively employing a production process including combustion synthesis. However, it was found that when the z value is less than 0.1, it is difficult to perform combustion synthesis. Hence, the z value needs to be 0.1 or greater in order to produce inexpensively a rolling contact member formed of a sintered body containing β sialon as a main component.

When the rolling contact member has a higher Young's modulus, the strength of the material constituting the rolling contact member tends to be increased. However, when the rolling contact member has a higher Young's modulus, the rolling contact member is less likely to be elastically deformed. Accordingly, an area of contact between rolling contact members is small, resulting in high pressure on the contacted surface. As a result, when an imposed load is increased abruptly, the rolling contact member is likely to be damaged. On the other hand, when the rolling contact member has a smaller Young's modulus, the rolling contact member tends to be elastically deformed, resulting in a large area of contact between rolling contact members. Accordingly, pressure on the contacted surface is low. However, when the rolling contact member has a smaller Young's modulus, the strength of the material constituting the rolling contact member tends to be decreased. Hence, the Young's modulus of the rolling contact member needs to fall within a range that ensures a balance between the strength of the material constituting the rolling contact member and reduction of pressure on the contacted surface of rolling contact members.

More specifically, when the rolling contact member formed of the β sialon sintered body has a Young's modulus of less than 180 GPa, the decrease in strength of the material constituting the rolling contact member has a greater influence as compared with the effect of reducing the pressure of the contacted surface, with the result that the rolling contact member has a decreased rolling contact fatigue life. In addition, due to increase in area of contact between the rolling contact members, frictional force exerting between the rolling contact members is increased to result in increased bearing torque, disadvantageously. As such, the rolling contact member formed off, sialon sintered body needs to have a Young's modulus of 180 GPa or greater. On the other hand, when the rolling contact member formed of β-sialon sintered body has a Young's modulus of more than 270 MPa, increase in pressure on the contacted surface thereof has a greater influence as compared with the effect of increasing the strength of the material constituting the rolling contact member. Accordingly, when an imposed load is increased, the rolling contact member is likely to be damaged, for example, deformed, at the raceway surface making contact with another rolling contact member. This results in decreased rolling contact fatigue life of the rolling contact member formed of β sialon sintered body. Accordingly, when used in an application where an imposed load is changed abruptly, the rolling contact member formed of the β sialon sintered body needs to have a Young's modulus of 270 GPa or smaller.

In view of this, the rolling contact member of the one aspect of the present invention is formed of the sintered body that contains as a main component β-sialon represented by a compositional formula of $Si_{6-z}Al_zO_zN_{8-z}$ and satisfying $0.1 \leq z \leq 3.5$ and that has the remainder formed of an impurity, and has a Young's modulus of 180 GPa or greater but 270 GPa or smaller. Hence, according to the rolling contact member of the one aspect of the present invention, there can be provided a rolling contact member formed of a β sialon sintered body inexpensive, capable of reliably ensuring sufficient durability, and capable of being used in an application where an imposed load is changed abruptly.

When used in an application where an imposed load is relatively large, the rolling contact member desirably has a Young's modulus of 220 GPa or greater. On the other hand, when used in an environment where an imposed load such as external impact is changed greatly, the rolling contact member desirably has a Young's modulus of 260 GPa or less.

Further, the rolling contact member of the another aspect of the present invention has basically the same configuration as that of the rolling contact member of the one aspect of the present invention, and provides a similar function and effect. However, in consideration of applications of the rolling contact member and the like, the rolling contact member of the another aspect of the present invention is different from the rolling contact member of the one aspect of the present invention in that it includes a sintering additive. According to the rolling contact member of the another aspect of the present invention, the sintering additive thus adopted is likely to achieve decreased porosity of the sintered body. In this way, there can be readily provided a rolling contact member formed of a β-sialon sintered body capable of reliably ensuring sufficient durability.

The sintering additive can be selected from at least one of an oxide, a nitride and an oxynitride of magnesium (Mg), aluminum (Al), silicon (Si), titanium (Ti) and a rare earth element. Furthermore, to achieve a function and effect equivalent to that of the rolling contact member in the one aspect of the present invention, it is desirable that the sintering additive be equal to or smaller than 20% by mass of the sintered body.

The rolling contact member preferably has a rolling contact surface serving as a surface contacting another rolling contact member, the rolling contact surface being included in a portion having a high density layer higher in density than an inner portion.

The density in the rolling contact member formed of the sintered body containing β-sialon as a main component has a great influence over the rolling contact fatigue life. In view of this, according to the above configuration, the high density layer, which is a layer having a density higher than that of the inner portion, is provided in the portion including the raceway surface to improve the rolling contact fatigue life. In this way, there can be provided a rolling contact member formed of a β sialon sintered body capable of reliably ensuring sufficient durability.

Herein, a high density layer is a layer in a sintered body that is low in porosity (or high in density), and can be inspected for example as follows. Initially, the rolling contact member is cut along a cross section perpendicular to a surface of the rolling contact member and the cross section is mirror-lapped. The mirror-lapped cross section is then imaged through an optical microscope with oblique illumination (a dark field) at a magnification for example of approximately 50-100 times, and stored in an image equal to or larger than 300 dots per inch (DPI). In doing so, a portion that is white in color is observed as a white color portion, which corresponds to a portion high in porosity (or low in density). Accordingly, a portion having a white color portion having a small area ratio is higher in density than a portion having a white color portion having a large area ratio. An image processor is used to binarize the stored image by a brightness threshold value and a white color portion's area ratio is thus measured and therefrom the imaged portion's density can be obtained.

In other words, the present rolling contact member preferably has a raceway surface included in a portion having a high density layer having a white color portion having a smaller area ratio than an inner portion does. Note that preferably the imaging is done randomly at least five locations and the area ratio is evaluated from an average value thereof. Furthermore, the rolling contact member at an inner portion has a white color portion having an area ratio for example equal to or larger than 15%. Furthermore, to provide the rolling contact member with further increased rolling contact fatigue life, it is preferable that the high density layer has a thickness equal to or larger than 100 μm.

In the above rolling contact member preferably when the high density layer is observed in cross section with an optical microscope with oblique illumination, the layer exhibits a portion observed as a portion white in color having an area ratio equal to or smaller than 7%.

The high density layer improved in density to an extent allowing a white color portion to have an area ratio equal to or smaller than 7% provides the rolling contact member with further increased rolling contact fatigue life. The present rolling contact member can thus achieve further increased rolling contact fatigue life.

In the above rolling contact member preferably the high density layer has a surface included in a higher density layer higher in density than another portion of the high density layer.

A higher density layer further higher in density and provided at a portion including a surface of the high density layer can further enhance the rolling contact member's durability against rolling contact fatigue and thus provide the rolling contact member with further increased rolling contact fatigue life.

In the above rolling contact member preferably when the higher density layer is observed in cross section with an optical microscope with oblique illumination, the layer exhibits a portion observed as a portion white in color having an area ratio equal to or smaller than 3.5%.

The higher density layer improved in density to an extent allowing a white color portion to have an area ratio equal to or smaller than 3.5% provides the rolling contact member with further increased rolling contact fatigue life. The present rolling contact member can thus achieve further increased rolling contact fatigue life.

In the rolling contact member, the rolling bearing may be a rolling bearing, used for a wind turbine generator, for rotatably supporting one of a main shaft of a windmill for the wind turbine generator and a rotation member, which is rotated according to rotation of the main shaft, relative to a member disposed opposite to one of the main shaft and the rotation member.

The present invention provides a rolling bearing including: a race member; and a plurality of rolling elements disposed in contact with the race member on an annular raceway. At least one of the race member and the rolling element is the rolling contact member of the present invention as described above.

According to the rolling bearing of the present invention, there can be provided a rolling bearing including a rolling contact member formed of β-sialon sintered body inexpensive, capable of reliably ensuring sufficient durability, and capable of being used in an application where an imposed load is changed abruptly.

Effects of the Invention

As apparent from the above description, according to the rolling contact member and the rolling bearing of the present invention, there can be provided a rolling contact member formed of a β-sialon sintered body inexpensive, capable of reliably ensuring sufficient durability, and capable of being used in an application where an imposed load is changed abruptly, as well as a rolling bearing including such a rolling contact member.

DESCRIPTION OF THE REFERENCE SIGNS

1: deep-grooved ball bearing; 2: thrust needle roller bearing; 3: hub unit; 11: outer ring; 11A: outer ring raceway surface; 11B: outer ring high density layer; 11C, 12C, 13C: inner portion; 11D: outer ring higher density layer; 12: inner ring; 12A: inner ring raceway surface; 12B: inner ring high density layer; 12D: inner ring higher density layer; 13: ball; 13A: ball raceway surface; 13B: ball high density layer; 13D: ball higher density layer; 14, 24, 39A, 39B: cage; 21: bearing washer; 21A: bearing washer raceway surface; 21B: bearing washer high density layer; 21C, 23C: inner portion; 21D: bearing washer higher density layer; 23: needle roller; 23A: roller raceway surface; 23B: roller high density layer; 23D: roller higher density layer; 31: outer ring; 31A1, 31A2, 32A, 33A: raceway surface; 31B: outer ring high density layer; 31C, 32C, 33C, 34C: inner portion; 31D: outer ring higher density layer; 32: hub ring; 32B: hub ring high density layer; 32D: hub ring higher density layer; 33: inner ring; 33B: inner ring high density layer; 33D: inner ring higher density layer; 34: ball; 34A: ball raceway surface; 34B: ball high density layer; 34D: ball higher density layer; 35: hub ring flange; 35A: hub ring through hole; 36: bolt; 37: outer ring flange; 37A: outer ring through hole; 38: fixing ring; 39A, 39B: cage; 101: main shaft bearing; 102: power generator bearing; 103: roller bearing; 111, 121: outer ring; 111A: outer ring raceway surface; 111B: outer ring high density layer; 111C, 112C, 113C: inner portion; 111D: outer ring higher density layer; 111E: through hole; 111F: outer circumferential surface; 112, 122: inner ring; 112A: inner ring raceway surface; 112B: inner ring high density layer; 112D: inner ring higher density layer; 112E: brim portion; 112F: inner circumferential surface; 113: roller; 113A: roller raceway surface; 113B: roller high density layer; 113D: roller higher density layer; 114: cage; 123: ball; 150: wind turbine generator; 151: main shaft; 151A: outer circumferential surface; 152: blade; 153: housing; 153A: inner wall; 154: step-up gear box; 155: output shaft; 156: power generator; 159: nacelle; 171: rotor; 172:

rotor shaft; 172A: outer circumferential surface; 173: stator; 174: housing; 190: outer ring gear; 190A: gear portion; 191: input shaft; 192: planetary carrier; 193: planetary gear; 193A, 194A, 195A, 196A, 197A, 198A: gear portion; 194: low-speed shaft; 195: low-speed gear; 196: mid-speed shaft; 197: mid-speed gear; 198: high-speed shaft; 199: housing.

BEST MODES FOR CARRYING OUT THE INVENTION

Hereinafter reference will be made to the drawings to describe the present invention in embodiments. In the figures, identical or corresponding components are identically denoted and will not be described repeatedly.

First Embodiment

Initially reference will be made to FIG. 1 and FIG. 2 to describe a deep-grooved ball bearing implementing a rolling bearing in a first embodiment.

Figure 1:
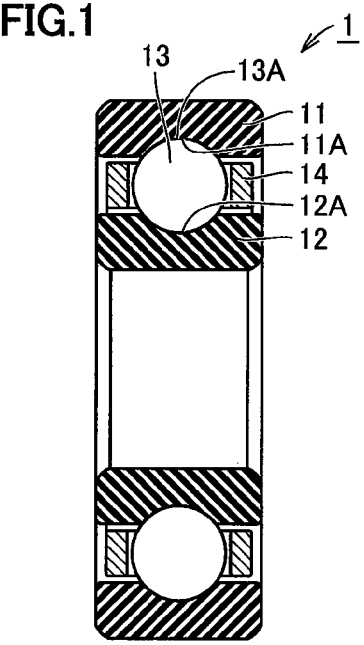
FIG. 1 is a schematic cross section of a configuration of a deep-grooved ball bearing in a first embodiment.

With reference to FIG. 1, a deep-grooved ball bearing 1 includes a race member implemented as an annular outer ring 11, a race member implemented as an annular inner ring 12 arranged to be inner than outer ring 11, and rolling elements implemented as a plurality of balls 13 arranged between outer and inner rings 11 and 12 and held in an annular cage 14. Outer ring 11 has an inner circumferential surface having an outer ring raceway surface 11A and inner ring 12 has an outer circumferential surface having an inner ring raceway surface 12A. Outer ring 11 and inner ring 12 are disposed such that inner ring raceway surface 12A and outer ring raceway surface 11A face each other. The plurality of balls 13 have rolling contact surfaces 13A in contact with inner ring raceway surface 12A and outer ring raceway surface 11A, and are disposed at a predetermined pitch in the circumferential direction by means of cage 14, thus being held in a rollable manner on an annular raceway. By such a configuration, outer ring 11 and inner ring 12 of deep-grooved ball bearing 1 can be rotated relative to each other.

Figure 2:
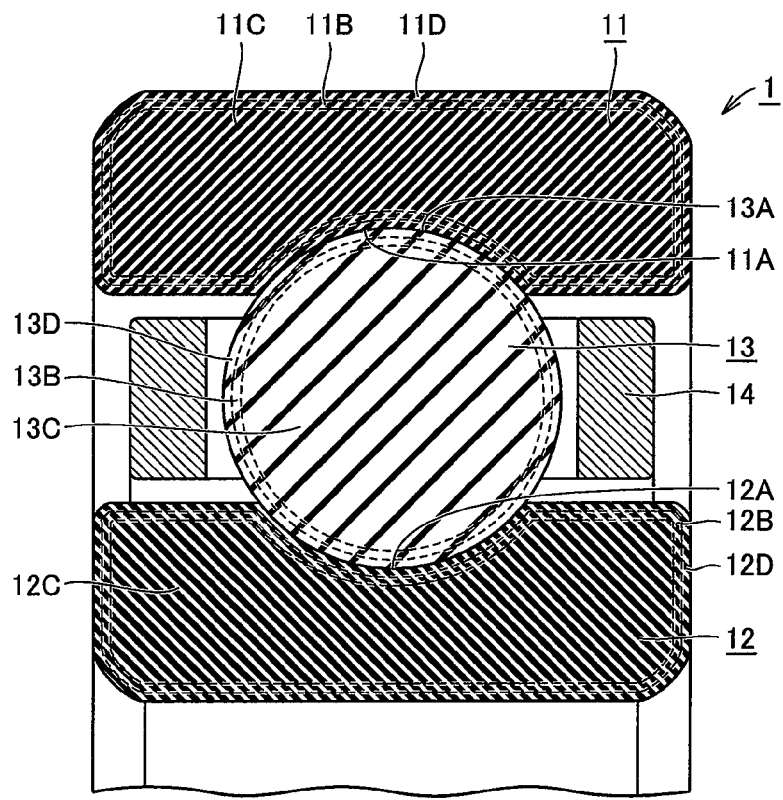
FIG. 2 is an enlarged schematic partial cross section of a main portion of FIG. 1.

Herein, with reference to FIG. 2, the present embodiment provides rolling contact members implemented as outer ring 11, inner ring 12 and ball 13 each constituted by a sintered body that contains as a main component β-sialon represented by a compositional formula of $Si_{6-z}Al_zO_zN_{8-z}$ and satisfying $0.1 \leq z \leq 3.5$ and that has a remainder formed of an impurity, and the rolling contact members have a Young's modulus of 180 GPa or greater but 270 GPa or smaller. Furthermore, outer ring 11, inner ring 12 and ball 13 have outer ring raceway surface 11A, inner ring raceway surface 12A and ball rolling contact surface 13A, respectively, included in a portion provided with an outer ring high density layer 11B, an inner ring high density layer 12B and a ball high density layer 13B higher in density than inner portions 11C, 12C, 13C. When outer ring high density layer 11B, inner ring high density layer 12B and ball high density layer 13B are observed in cross section with an optical microscope with oblique illumination, they exhibit a portion white in color, hereinafter also referred to as a white color portion, having an area ratio equal to or smaller than 7%. The present embodiment thus provides deep-grooved ball bearing 1 that serves as a rolling bearing including a rolling contact member (outer ring 11, inner ring 12 and ball 13) formed of a sintered β-sialon inexpensive, capable of reliably ensuring sufficient durability, and capable of being used in an application where an imposed load is changed abruptly. The impurity includes an unavoidably introduced impurity including those derived from a source material or entering during the production process.

Note that in the present embodiment, the rolling contact member implemented as outer ring 11, inner ring 12 and ball 13 may be formed of a sintered body that contains β-sialon as a main component and has a remainder formed of a sintering additive and an impurity. The sintering additive helps to reduce the sintered body in porosity and hence provide a rolling bearing including a rolling contact member formed of a sintered β-sialon capable of reliably ensuring sufficient durability. The impurity includes an unavoidably introduced impurity including those derived from a source material or entering during the production process.

Furthermore, with reference to FIG. 2, outer ring high density layer 11B, inner ring high density layer 12B and ball high density layer 13B have surfaces, or outer ring raceway surface 11A, inner ring raceway surface 12A and ball rolling contact surface 13A, respectively, included in a portion provided with an outer ring higher density layer 11D, an inner ring higher density layer 12D and a ball higher density layer 13D further higher in density than the other portions of outer ring high density layer 11B, inner ring high density layer 12B and ball high density layer 13B. When outer ring higher density layer 11D, inner ring higher density layer 12D and ball higher density layer 13D are observed in cross section with an optical microscope with oblique illumination, they exhibit a white color portion having an area ratio equal to or smaller than 3.5%. Outer ring 11, inner ring 12 and ball 13 are thus further improved in durability against rolling contact fatigue and thus achieve further improved rolling contact fatigue life.

Hereinafter reference will be made to FIG. 3 to FIG. 5 to describe a thrust needle roller bearing serving as a rolling bearing in an exemplary variation of the first embodiment.

Figure 3:
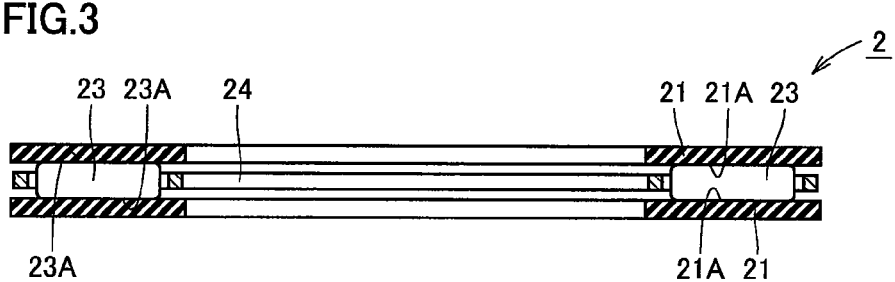
FIG. 3 is a schematic cross section of a configuration of a thrust needle roller bearing in an exemplary variation of the first embodiment.
Figure 4:
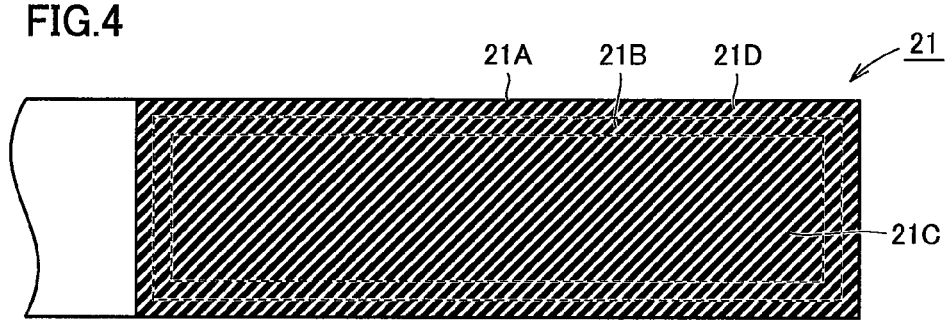
FIG. 4 is an enlarged schematic partial cross section of a main portion of a bearing washer that the thrust needle roller bearing of FIG. 3 includes.
Figure 5:
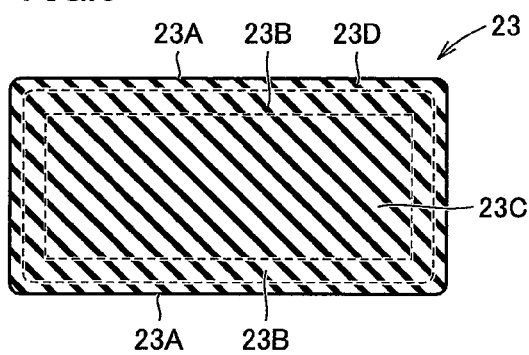
FIG. 5 is an enlarged schematic partial cross section of a main portion of a needle roller that the thrust needle roller bearing of FIG. 3 includes.

With reference to FIG. 3 to FIG. 5, a thrust needle roller bearing 2 is basically similar in configuration and effect to deep-grooved ball bearing 1 described with reference to FIG. 1, except that the former includes a race member and a rolling element different in configuration than the latter. More specifically, thrust needle roller bearing 2 includes a pair of bearing washers 21 in the form of a disk, serving as race members arranged such that their respective, one main surfaces face each other, a plurality of needle rollers 23 serving as a rolling element, and an annular cage 24. The plurality of needle rollers 23 have their respective outer circumferential surfaces or rolling contact surfaces 23A in contact with bearing washer raceway surface 21A formed at the main surfaces of the pair of bearing washers 21 facing each other, and are disposed at a predetermined pitch in the circumferential direction by means of cage 24, thus being held in a rollable manner on an annular raceway. By such a configuration, the pair of bearing washers 21 of thrust needle roller bearing 2 can be rotated relative to each other.

Herein in the present exemplary variation, the rolling contact members implemented as bearing washer 21 and needle roller 23 correspond to outer ring 11 or inner ring 12 and ball 13 described above respectively and have similar inner portions 21C, 23C, high density layers (a bearing washer high density layer 21B, a roller high density layer 23B), and higher density layers (a bearing washer higher density layer 21D, a roller higher density layer 23D). Thus the present exemplary variation provides thrust needle roller bearing 2 that is a rolling bearing including rolling contact members (bearing washer 21, needle roller 23) each formed of a sintered β-sialon inexpensive, capable of reliably ensuring sufficient durability, and capable of being used in an application where an imposed load is changed abruptly.

The following will describe a method for producing a rolling bearing in the first embodiment serving as one embodiment of the present invention.

Figure 6:
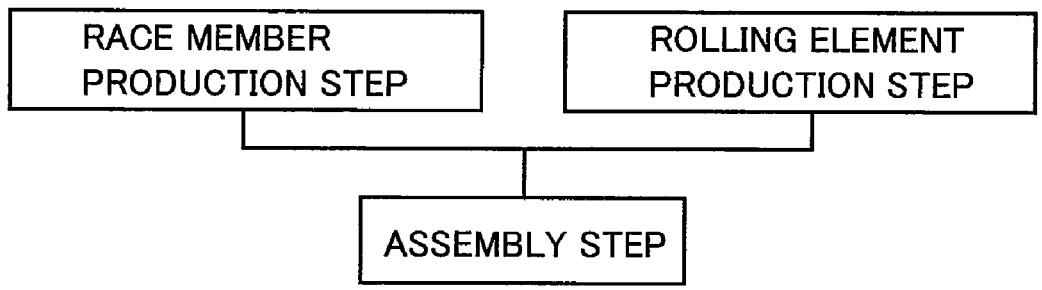
FIG. 6 generally represents a method of producing a rolling bearing in the first embodiment.

With reference to FIG. 6, in the present embodiment, a rolling bearing is produced in a method, as follows. Initially, a race member is produced in a race member production step and a rolling element is produced in a rolling element production step. More specifically the race member production step is performed to produce outer ring 11, inner ring 12, bearing washer 21 and the like. The rolling element production step is performed to produce ball 13, needle roller 23 and the like.

Then an assembly step is performed to combine the race member produced in the race member production step and the rolling element produced in the rolling element production step together to assemble a rolling bearing. More specifically, for example, outer ring 11 and inner ring 12, and ball 13 are combined together to assemble deep-grooved ball bearing 1. The race member production step and the rolling element production step are performed for example in accordance with a method of producing a rolling contact member, as will be described hereinafter.

Figure 7:
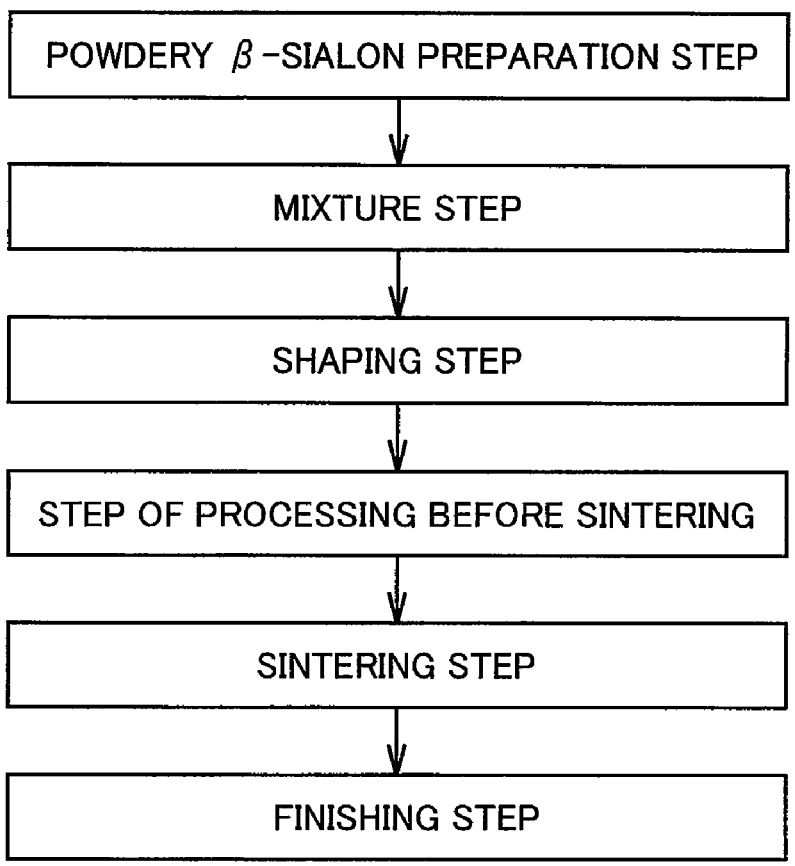
FIG. 7 generally represents a method of producing a rolling contact member, as included in a method of producing a rolling bearing in the first embodiment.

With reference to FIG. 7, in the present embodiment, a rolling contact member is produced in a method, as follows. Initially, powdery β-sialon is prepared in a powdery β-sialon preparation step. The powdery β-sialon preparation step can be performed for example with combustion synthesis adopted in a production step to produce powdery β-sialon inexpensively.

A mixture step is then performed to add a sintering additive to the powdery β-sialon prepared in the powdery β-sialon preparation step and mix them together. The mixture step can be omitted if the sintering additive is not added.

Then, with reference to FIG. 7, a shaping step is performed to shape the powdery β-sialon or the mixture of the powdery β-sialon and the sintering additive generally into the geometry of each rolling contact member. More specifically, the powdery β-sialon or the mixture of the powdery β-sialon and the sintering additive is press-formed, cast-molded, extrusion-formed, rolling-granulated, or similarly shaped to provide a body shaped generally into the geometry of each rolling contact member implemented as outer ring 11, inner ring 12, ball 13, bearing washer 21, needle roller 23 and the like.

The step of forming before sintering is then performed to form a surface of the shaped body to allow the shaped body that has been sintered to have a geometry closer to that of a rolling contact member as desired. More specifically, green body forming or a similar forming technique is used to process the shaped body so that the shaped body having been sintered can have a geometry closer to that of outer ring 11, inner ring 12, ball 13, bearing washer 21, needle roller 23 or the like. The step of forming before sintering can be omitted if the shaping step provides a shaped body in a condition allowing the shaped body that has been sintered to have a geometry close to that of a rolling contact member as desired.

Then, with reference to FIG. 7, a sintering step is performed to sinter the shaped body. More specifically, the shaped body is heated with a heater, a microwave, a millimeter wave or a similar electromagnetic wave and thus sintered at a pressure equal to or smaller than 1 MPa to provide a sintered body generally having a geometry of outer ring 11, inner ring 12, ball 13, bearing washer 21, needle roller 23 or the like. The shaped body is sintered by being heated in an atmosphere of an inert gas or that of a gaseous mixture of nitrogen and oxygen to a range of 1550° C. to 1800° C. The inert gas can be helium, neon, argon, nitrogen or the like. In view of production cost reduction, nitrogen is preferably adopted.

Then the sintered body produced in the sintering step has a surface worked to remove a portion including that surface, i.e., it is worked for finish, to complete rolling contact members, i.e., a finishing step is performed. More specifically, the sintered body produced in the sintering step has a surface polished to complete a rolling contact member implemented as outer ring 11, inner ring 12, ball 13, bearing washer 21, needle roller 23 and the like. Through the above steps the rolling contact member in the present embodiment completes.

As a result of the sintering step, in the sintered body at a portion from its surface to a depth of approximately 500 μm, there is formed a high density layer higher in density than an inner portion and having a portion white in color, or a white color portion, as observed in cross section with an optical microscope with oblique illumination, in an area ratio equal to or smaller than 7%. Furthermore, the sintered body has, at a portion from its surface to a depth of approximately 150 μm, a higher density layer further higher in density than the other portion of the high density layer and having a portion white in color, or a white color portion, as observed in cross section with an optical microscope with oblique illumination, in an area ratio equal to or smaller than 3.5%. Accordingly in the finishing step the sintered body is removed preferably by a thickness equal to or smaller than 150 μm in a portion that should serve as a raceway/rolling contact surface in particular. This allows the higher density layer to remain in a portion including outer ring raceway surface 11A, inner ring raceway surface 12A, ball rolling contact surface 13A, bearing washer raceway surface 21A and roller rolling contact surface 23A to provide the rolling contact member with improved rolling contact fatigue life.

Note that the step of sintering the shaped body is performed preferably at a pressure equal to or larger than 0.01 MPa to reduce or prevent decomposition of β-sialon, and more preferably at a pressure equal to or larger than the atmospheric pressure when cost reduction is considered. Furthermore, to provide the high density layer while reducing production cost, the step of sintering the shaped body is performed preferably at a pressure equal to or smaller than 1 MPa. Further, to adjust the Young's modulus of the produced rolling contact member to a desired value of 180 GPa or greater but 270 GPa or smaller, for example, the z value of the powdery β-sialon prepared in the powdery β-sialon preparation step is adjusted in a range of $0.1 \leq z \leq 3.5$. More specifically, by increasing the z value, the Young's modulus of the produced rolling contact member can be decreased.

Second Embodiment

Figure 8:
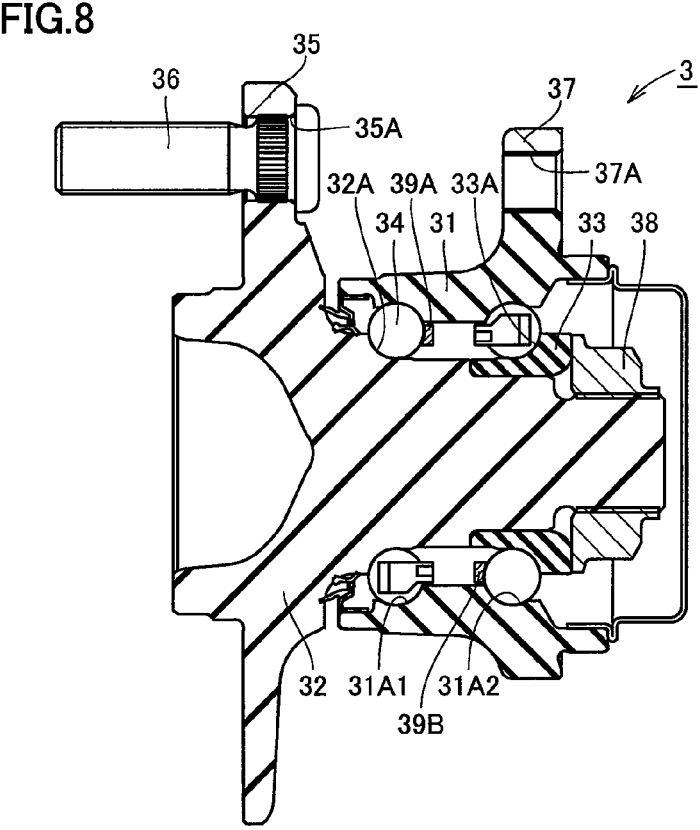
FIG. 8 is a schematic cross section of a configuration of a hub unit, which is a rolling bearing in a second embodiment.
Figure 9:
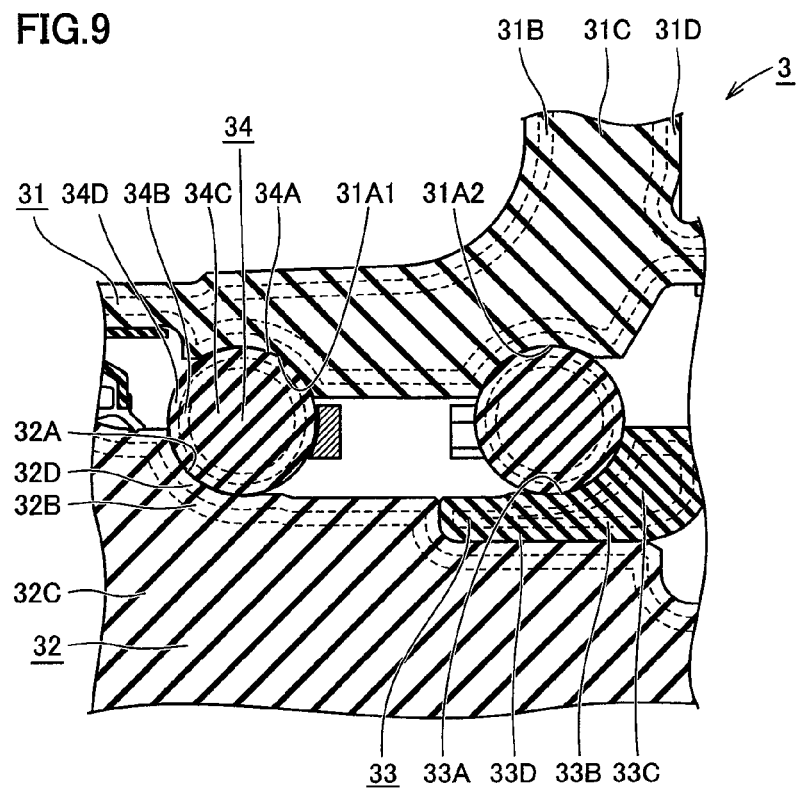
FIG. 9 is an enlarged schematic partial cross section of a main portion of FIG. 8.

With reference to FIGS. 8 and 9, a second embodiment provides a hub unit, as will be described hereinafter.

With reference to FIG. 8 and FIG. 9, a hub unit 3 is basically similar in configuration and effect to deep-grooved ball bearing 1 described with reference to FIG. 1, except that the former includes a race member and a rolling element different in configuration than the latter. More specifically, hub unit 3 is a device posed between a vehicular wheel and a vehicular body and rotatably supporting the wheel relative to the body. Hub unit 3 includes a race member implemented as an outer ring 31, a hub ring 32 and an inner ring 33, and a rolling element implemented as a plurality of balls 34.

Outer ring 31, serving as an outer member, is an annular race member having an inner circumferential surface provided with two rows of raceway surfaces 31A1, 31A2.

Hub ring 32, serving as an inner member, is a race member having a raceway surface 32A opposite to one raceway surface 31A1 of outer ring 31 and disposed to have a portion surrounded by outer ring 31. Furthermore, inner ring 33, serving as an inner member, is an annular race member that has a raceway surface 33A opposite to the other raceway surface 31A2 of outer ring 31, and is fitted in contact with a portion of an outer circumferential surface of hub ring 32, and fixed to hub ring 32 by a fixing ring 38 fitted in in contact with a portion of an outer circumferential surface of hub ring 32.

The plurality of balls 34 are rotatably arranged on an annular raceway of a plurality of (two) rows. One row is in contact with one raceway surface 31A1 of outer ring 31 and raceway surface 32A of hub ring 32 and arranged by an annular cage 39A in a circumferential direction at a predetermined pitch. The other row is in contact with the other raceway surface 31A2 of outer ring 31 and raceway surface 33A of inner ring 33 and arranged by an annular cage 39B in a circumferential direction at a predetermined pitch. The outer member implemented as outer ring 31 and the inner member implemented as hub ring 32 and inner ring 33 can thus rotate relative to each other.

Furthermore, hub ring 32 has a hub ring flange 35 having a hub ring through hole 35A. Hub ring through hole 35A receives a bolt 36 to fix hub ring flange 35 and a vehicular wheel (not shown) to each other. Outer ring 31 has an outer ring flange 37 having an outer ring through hole 37A. Outer ring through hole 37A receives a bolt (not shown) to fix outer ring flange 37 and a suspension device (not shown) that is fixed to the vehicular body to each other. Thus hub unit 3 is posed between the vehicular wheel and the vehicular body to support the wheel relative to the body rotatably.

In other words, the present embodiment provides hub unit 3 that is a hub unit posed between a vehicular wheel and a vehicular body to support the wheel relative to the body rotatably. Hub unit 3 includes: an outer member implemented as outer ring 31 having an inner circumferential surface provided with annular raceway surface 31A1, 31A2; an inner member implemented as hub ring 32 provided with annular raceway surface 32A opposite to raceway surface 31A1 of outer ring 31 and disposed with at least a portion thereof surrounded by an inner circumferential surface of outer ring 31; and an inner member implemented as inner ring 33 provided with annular raceway surface 33A opposite to raceway surface 31A2 of outer ring 31 and disposed with at least a portion thereof surrounded by an inner circumferential surface of outer ring 31. Furthermore, hub unit 3 includes a plurality of balls 34 arranged on an annular raceway and in contact at a ball rolling contact surface 34A with outer ring 31 at raceway surfaces 31A1, 31A2 and hub ring 32 and inner ring 33 at raceway surfaces 32A, 33A.

Herein, with reference to FIG. 8 and FIG. 9, the present embodiment provides a rolling contact member (rolling contact member for a hub unit) implemented as outer ring 31, hub ring 32 and inner ring 33, and ball 34, which correspond respectively to outer ring 11 and inner ring 12, and ball 13 of the first embodiment and similarly have inner portions 31C, 32C, 33C, 34C, a high density layer (an outer ring high density layer 31B, a hub ring high density layer 32B, an inner ring high density layer 33B, a ball high density layer 34B) and a higher density layer (an outer ring higher density layer 31D, a hub ring higher density layer 32D, an inner ring higher density layer 33D, a ball higher density layer 34D). Thus the present embodiment provides hub unit 3 that is a rolling bearing including a rolling contact member (outer ring 31, hub ring 32, inner ring 33, ball 34) formed of a sintered β-sialon inexpensive, capable of reliably ensuring sufficient durability, and capable of being used in an application where an imposed load is changed abruptly. Note that the rolling bearing implemented in the second embodiment as hub unit 3 and the rolling contact member implemented in the same embodiment as outer ring 31, hub ring 32, inner ring 33, ball 34 that hub unit 3 includes in the same embodiment can be produced similarly as they are produced in the first embodiment.

Third Embodiment

Figure 10:
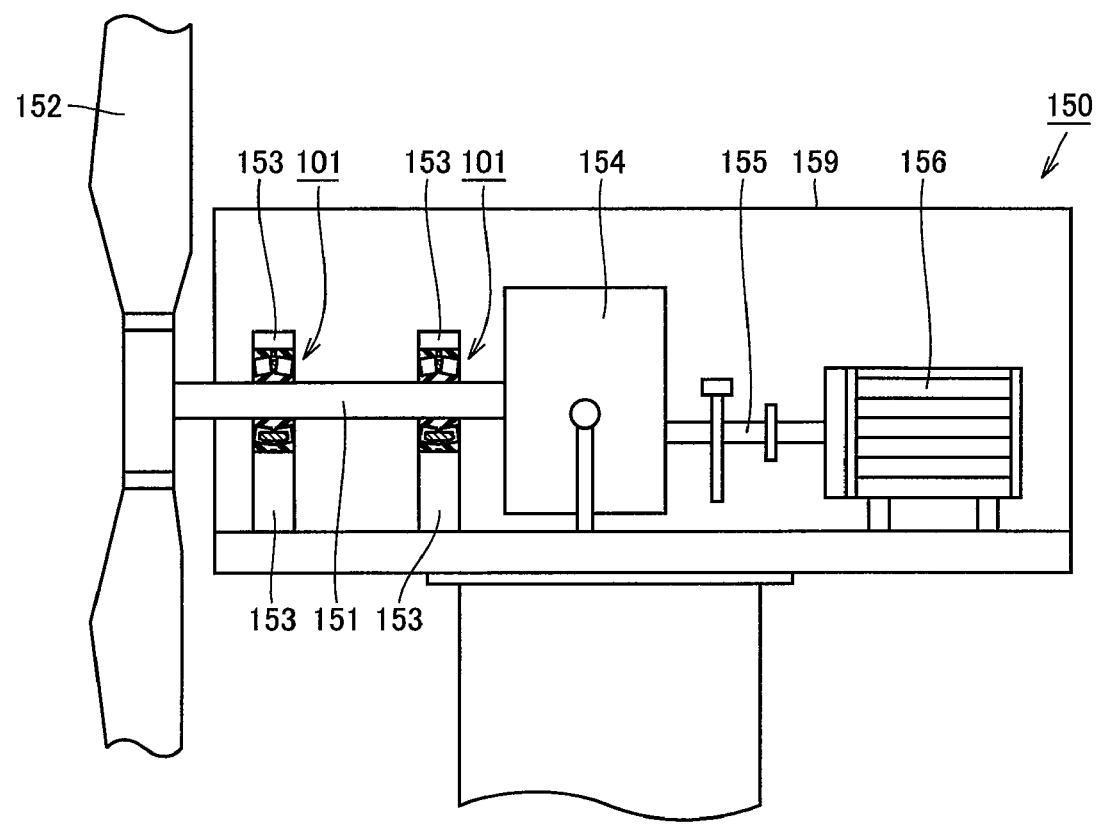
FIG. 10 is a schematic diagram showing a configuration of a wind turbine generator including a rolling bearing for a wind turbine generator in a third embodiment.

Referring to FIG. 10, a configuration of a wind turbine generator including a rolling bearing for a wind turbine generator in a third embodiment will be described.

Referring to FIG. 10, wind turbine generator 150 includes a blade 152 that is a rotating blade; a main shaft 151 having one end connected to blade 152 so as to include the central axis of blade 152; and a step-up gear box 154 connected to the other end of main shaft 151. Further, step-up gear box 154 includes an output shaft 155. Output shaft 155 is connected to a power generator 156. Main shaft 151 is supported by main shaft bearings 101, each of which is a rolling bearing for a wind turbine generator, so as to be rotatable around the axis. Further, the plurality of main shaft bearings 101 (two in FIG. 10) are arranged side by side in the axial direction of main shaft 151, and are held by housings 153 respectively. Main shaft bearings 101, housing 153, step-up gear box 154, and power generator 156 are contained in the inner portion of a nacelle 159, which is a machine room. The one end of main shaft 151 comes out of nacelle 159 and is connected to blade 152.

The following describes operations of wind turbine generator 150 of the third embodiment. Referring to FIG. 10, when blade 152 is rotated circumferentially according to force of received wind, main shaft 151 connected to blade 152 is rotated around the axis while being supported relative to housing 153 by main shaft bearings 101. The rotation of main shaft 151 is transmitted to step-up gear box 154 and is speeded up therein, thus converting it into rotation of output shaft 155 around its axis. The rotation of output shaft 155 is transmitted to power generator 156, which generates electromotive force using an electromagnetic induction effect. In this way, electric power is generated.

Next, a supporting structure for main shaft 151 of wind turbine generator 150 will be described.

Figure 11:
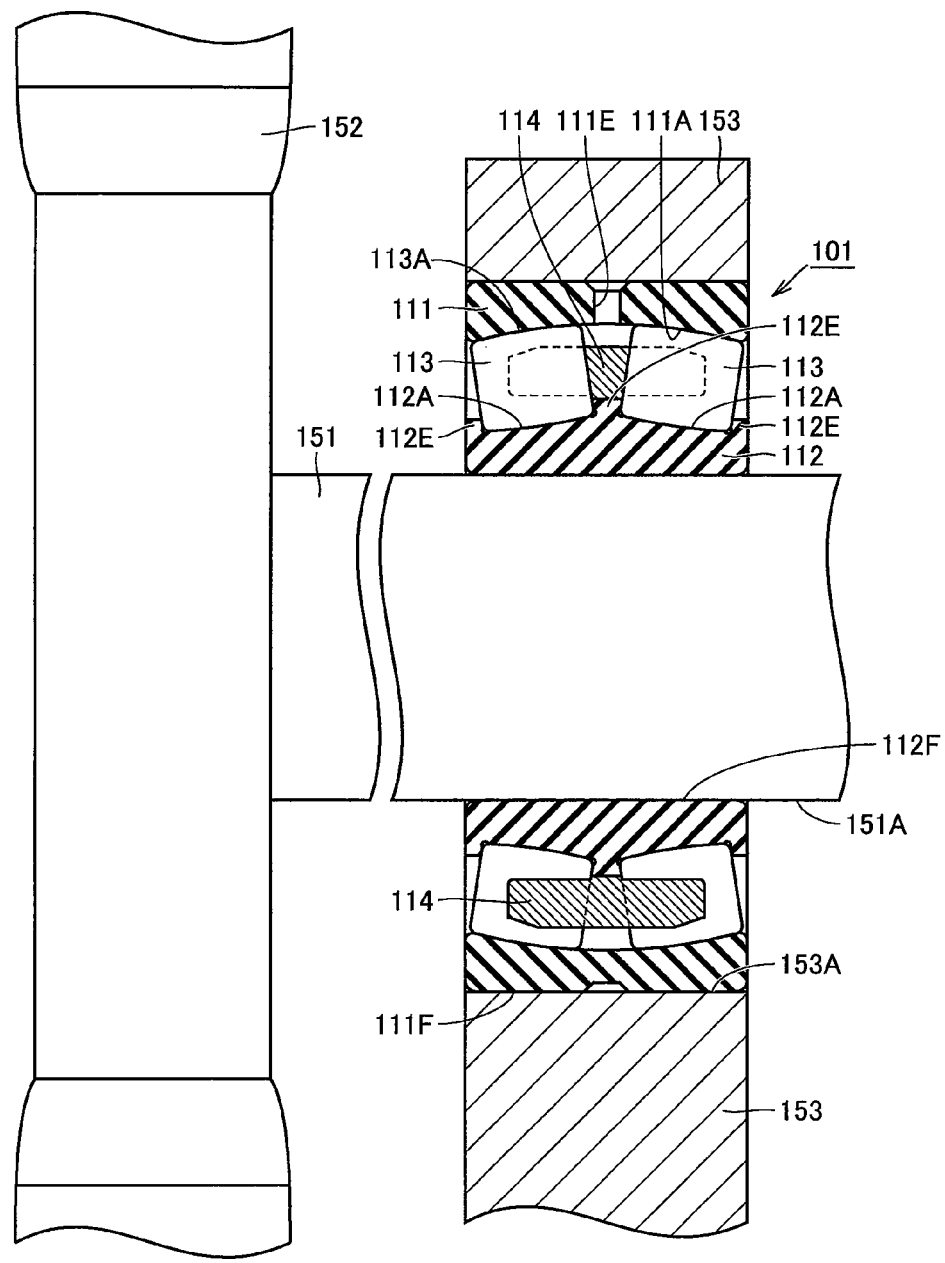
FIG. 11 is an enlarged schematic cross sectional view of a periphery of a main shaft bearing shown in FIG. 10.

Referring to FIG. 11, main shaft bearings 101 each serving as a rolling bearing for a wind turbine generator includes: an annular outer ring 111 serving as a rolling contact member of the rolling bearing for a wind turbine generator; an annular inner ring 112 disposed relative to an inner circumferential side of outer ring 111 and serving as a rolling contact member of the rolling bearing for a wind turbine generator; and a plurality of rollers 113 disposed between outer ring 111 and inner ring 112, held by an annular cage 114, and each serving as a rolling contact member of the rolling bearing for a wind turbine generator. In the inner circumferential surface of outer ring 111, an outer ring raceway surface 111A is formed. In the outer circumferential surface of inner ring 112, two inner ring raceway surfaces 112A are formed. Outer ring 111 and inner ring 112 are disposed so that two inner ring raceway surfaces 112A face outer ring raceway surface 111A. Further, the plurality of rollers 113 have roller raceway surfaces 113A making contact with outer ring raceway surface 111A and inner ring raceway surfaces 112A along two inner ring raceway surfaces 112A, are rotatably held by cages 114, and are disposed in a predetermined pitch circumferentially. In this way, they are held on the plurality of (two) annular raceways in a rollable manner. Further, outer ring 111 is provided with a through hole 111E radially penetrating outer ring 111. Via through hole 111E, a lubricant can be supplied to a space between outer ring 111 and inner ring 112. With such a configuration, outer ring 111 and inner ring 112 of each of main shaft bearings 101 are rotatable relative to each other.

Meanwhile, main shaft 151 connected to blade 152 penetrates inner ring 112 of main shaft bearing 101, is in contact with inner circumferential surface 112F of inner ring 112 at outer circumferential surface 151A, and is fixed to inner ring 112. Further, outer ring 111 of main shaft bearing 101 is fit in a through hole provided in housing 153 so as to be in contact with inner wall 153A at outer circumferential surface 111F, and is fixed to housing 153. According to the configuration, main shaft 151 connected to blade 152 is rotatable together with inner ring 112 around its axis with respect to outer ring 111 and housing 153.

Further, at the ends of each of inner ring raceway surfaces 112A in the width direction, a brim portion 112E is formed to project toward outer ring 111. In this way, the load generated in the axial direction of main shaft 151 when blade 152 catches wind is to be borne. Further, outer ring raceway surface 111A has a shape of sphere. Hence, in a cross section perpendicular to the direction in which rollers 113 rolls, outer ring 111 and inner ring 112 can form an angle with the center of the sphere as their centers. In other words, main shaft bearings 101 are double row self-aligning roller bearings. As a result, when main shaft 151 is bent by blade 152 having caught a wind, housings 153 can stably hold main shaft 151 in a rotatable manner using main shaft bearings 101.

In other words, each of outer ring 111, inner ring 112, and roller 113, each of which serves as the rolling contact member of the rolling bearing for a wind turbine generator in the third embodiment, is a race member or a rolling contact member that is a rolling element disposed in contact with the race member on its annular raceway, in main shaft bearing 101 serving as the rolling bearing for a wind turbine generator and rotatably supporting main shaft 151 of the windmill for the wind turbine generator relative to each housing 153 disposed opposite to main shaft 151. Further, outer ring 111, inner ring 112, and roller 113 are constituted by a sintered body that contains as main component β-sialon represented by a compositional formula of $Si_{6-z}Al_zO_zN_{8-z}$ and satisfying $0.1 \leq z \leq 3.5$ and that has a remainder formed of an impurity. They have a Young's modulus of 180 GPa or greater but 270 GPa or smaller.

Figure 12:
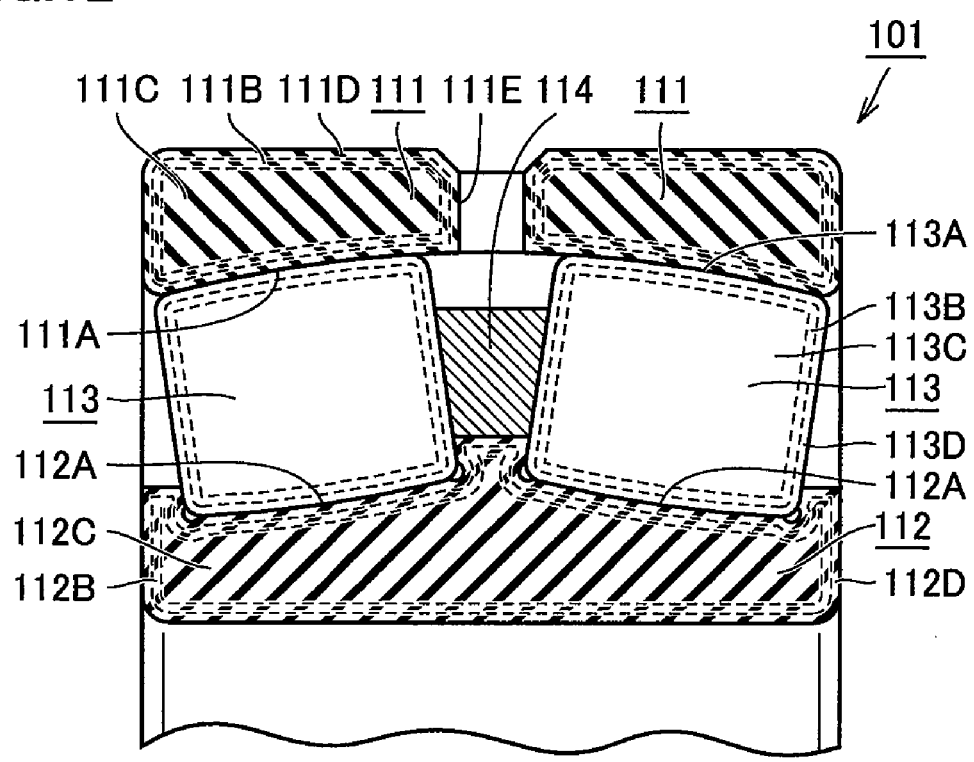
FIG. 12 is a partial schematic cross sectional view showing a main portion of the main shaft bearing of FIG. 11.

Referring to FIG. 12, a region including outer ring raceway surface 111A, inner ring raceway surface 112A, and roller contact surface 113A, which serve as raceway surfaces of outer ring 111, inner ring 112, and roller 113, is provided with an outer ring high density layer 111B, an inner ring high density layer 112B, and a roller high density layer 113B, each of which is a layer having a higher density than those of inner portions 111C, 112C, 113C. When a cross section of outer ring high density layer 111B, inner ring high density layer 112B, and roller high density layer 113B is observed through an optical microscope with oblique illumination, a portion observed as a portion white in color has an area ratio of 7% or smaller. Hence, main shaft bearing 101 of the present embodiment is a rolling bearing used for a wind turbine generator and including a rolling contact member (outer ring 111, inner ring 112, and roller 113) formed of a β-sialon sintered body inexpensive, capable of reliably ensuring sufficient durability, and capable of reducing and preventing damage when a great load is imposed abruptly. The above-described impurity includes an unavoidably introduced impurity including those derived from a source material or entering during the production process.

In the present embodiment, outer ring 111, inner ring 112, and roller 113 each serving as a rolling contact member of a rolling bearing for a wind turbine generator may be formed of a sintered body containing β-sialon as a main component and having a remainder formed of a sintering additive and an impurity. The inclusion of sintering additive is likely to reduce the porosity of the sintered body, thus readily providing a rolling bearing used for a wind turbine generator and including a rolling contact member formed of a β-sialon sintered body reliably ensuring sufficient durability. The impurity includes an unavoidably introduced impurity including those derived from a source material or entering during the production process.

Further, referring to FIG. 12, a region including outer ring raceway surface 111A, inner ring raceway surfaces 112A, and roller contact surface 113A, which are surfaces of outer ring high density layer 111B, inner ring high density layer 112B, and roller high density layer 113B, is provided with an outer ring higher density layer 111D, an inner ring higher density layer 112D, and an roller higher density layer 113D, which are layers having densities higher than those of the other regions in outer ring high density layer 111B, inner ring high density layer 112B, and roller high density layer 113B. When the cross section of outer ring higher density layer 111D, inner ring higher density layer 112D, and roller higher density layer 113D are observed by an optical microscope with oblique illumination, a portion observed as a portion white in color has an area ratio of 3.5% or smaller. In this way, outer ring 111, inner ring 112, and roller 113 are further improved in durability against rolling contact fatigue, thereby further improving rolling contact fatigue life.

It should be noted that main shaft bearing 101 in the third embodiment serving as a rolling bearing for a wind turbine generator, as well as outer ring 111, inner ring 112, and roller 113 provided in each main shaft bearing 101 and serving as a rolling contact member for a wind turbine generator can be produced in a way similar to the first embodiment.

Fourth Embodiment

Figure 13:
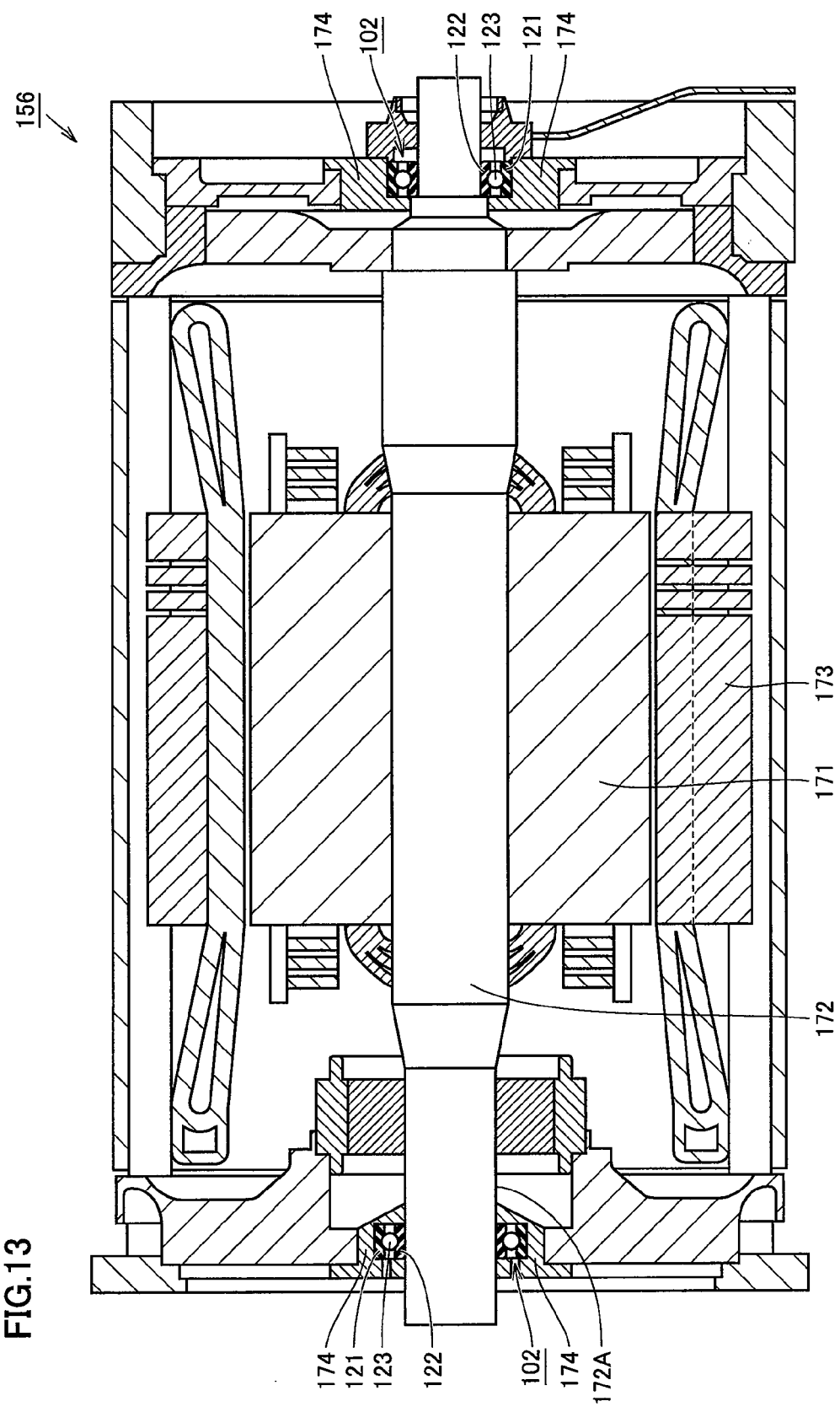
FIG. 13 is a schematic diagram showing a configuration of a power generator including a power generator bearing serving as a rolling bearing for a wind turbine generator in a fourth embodiment.

Referring to FIG. 13, power generator 156 includes: a rotor 171; a rotor shaft 172 penetrating the central portion of rotor 171 and connected to output shaft 155 of step-up gear box 154 (see FIG. 10); and a stator 173 disposed opposite to the outer circumferential surface of rotor 171. A pair of housings 174, 174 are disposed opposite to outer circumferential surface 172A of rotor shaft 172. Between outer circumferential surface 172A of rotor shaft 172 and the pair of housings 174, 174, a pair of power generator bearings 102, 102 are disposed to each serve as a rolling bearing for a wind turbine generator. In this way, rotor shaft 172 is held relative to housings 174 to be rotatable around its axis. Rotor 171 is rotatable together with rotor shaft 172.

Next, operations of power generator 156 will be described. Referring to FIG. 10, when blade 152 of wind turbine generator 150 catches wind and is rotated, main shaft 151 is rotated. The rotation of main shaft 151 is speeded up by step-up gear box 154 and is output to cause rotation of output shaft 155. Referring to FIG. 10 and FIG. 13, rotor shaft 172, connected to output shaft 155, is rotated according to the rotation of blade 152. Referring to FIG. 13, rotor 171 is rotated following the rotation of rotor shaft 172. In this case, rotor 171 is rotated relative to stator 173 disposed opposite to the outer circumferential side of rotor 171. As a result, an electromagnetic induction effect causes generation of electromotive force in stator 173. In this way, electric power is generated.

Namely, power generator bearing 102 serving as a rolling bearing for a wind turbine generator in the fourth embodiment is a bearing used for a power generator adapted to generate electromotive force in stator 173 disposed opposite to the outer circumferential side of rotor 171 in response to rotation of rotor 171, and rotatably supports rotor shaft 172, which penetrates rotor 171 and rotates together with rotor 171, relative to housing 174 disposed opposite to outer circumferential surface 172A of rotor shaft 172.

In other words, power generator bearing 102 is a rolling bearing used for a wind turbine generator and adapted to rotatably support rotor shaft 172, which is a rotation member rotating in response to rotation of main shaft 151 of the windmill for a wind turbine generator, relative to housing 174 disposed opposite to rotor shaft 172. It should be noted that power generator bearing 102 serving as a rolling bearing for a wind turbine generator as well as outer ring 121, inner ring 122, and ball 123 each provided in power generator bearing 102 and each serving as a rolling contact member for a wind turbine generator have the same configurations as that of deep-grooved ball bearing 1 of the first embodiment as well as those of outer ring 11, inner ring 12, and ball 13 provided in deep-grooved ball bearing 1, operate similarly, and can be produced similarly.

Fifth Embodiment

Figure 14:
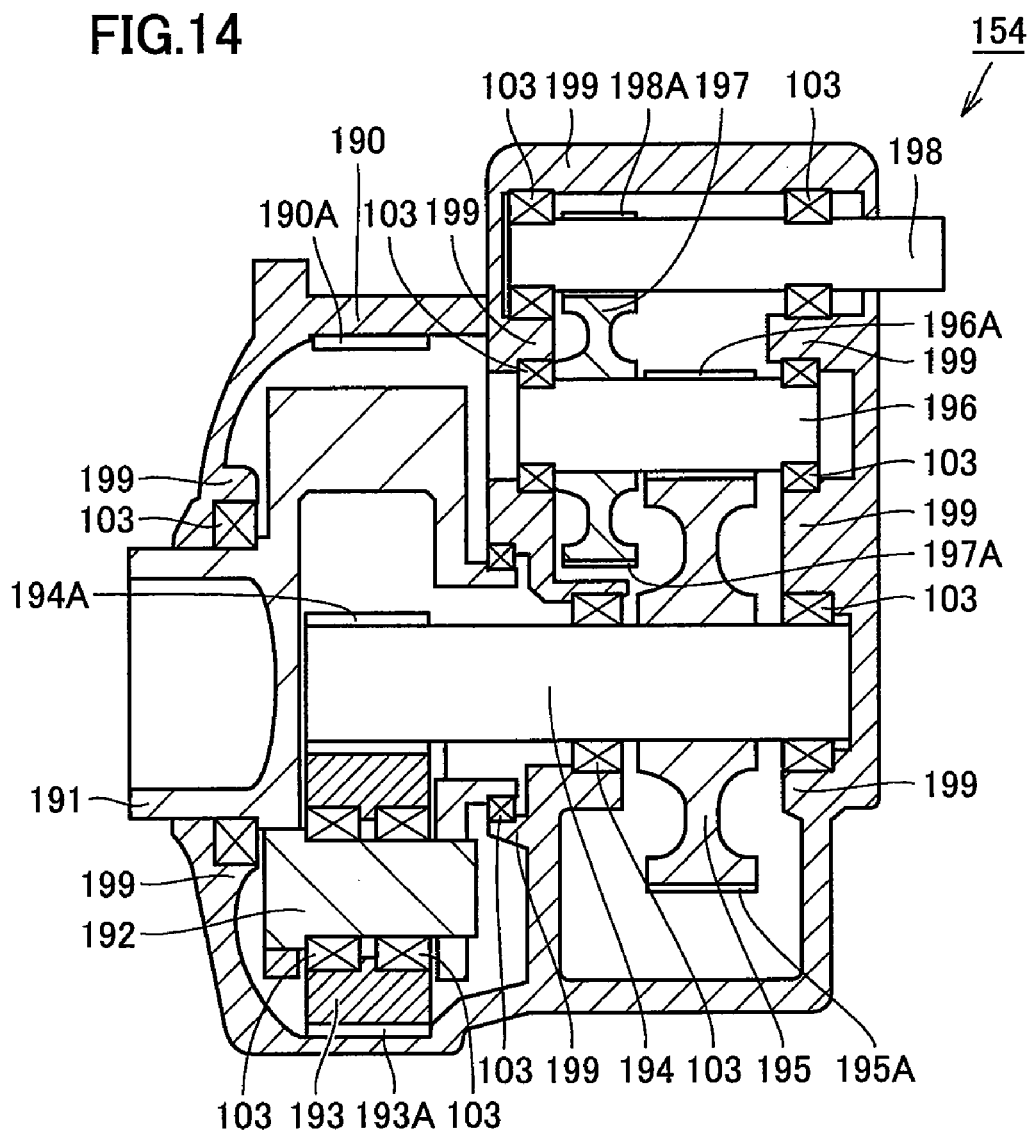
FIG. 14 is a schematic diagram showing a configuration of a step-up gear box including a step-up gear box bearing serving as a rolling bearing for a wind turbine generator in a fifth embodiment.

Referring to FIG. 14, step-up gear box 154 includes: an input shaft 191 connected to main shaft 151 (see FIG. 10); a planetary carrier 192 connected to input shaft 191 via an arm portion, which radially extends from input shaft 191, and projecting in the axial direction; a planetary gear 193 disposed to surround the outer circumferential surface of planetary carrier 192 and having an outer circumferential surface on which a gear portion 193A is formed; a low-speed shaft 194 having an outer circumferential surface on which a gear portion 194A is formed to always engage with gear portion 193A of planetary gear 193; an outer ring gear 190 having an inner circumferential surface on which a gear portion 190A is formed to always engage with gear portion 193A of planetary gear 193; and a low-speed gear 195 having an annular shape, fixed to the outer circumferential surface of low-speed shaft 194, and having an outer circumferential surface on which gear portion 195A is formed. Further, step-up gear box 154 includes: a mid-speed shaft 196 having an outer circumferential surface on which a gear portion 196A is formed to always engage with gear portion 195A of low-speed gear 195; a mid-speed gear 197 having an annular shape, fixed to the outer circumferential surface of mid-speed shaft 196, and having an outer circumferential surface on which gear portion 197A is formed; and a high-speed shaft 198 having an outer circumferential surface on which gear portion 198A is formed to always engage with gear portion 197A of mid-speed gear 197.

Input shaft 191 and planetary carrier 192 are rotatably supported by roller bearings 103, 103 relative to housings 199 disposed opposite to their outer circumferential surfaces. Between planetary carrier 192 and planetary gear 193, two roller bearings 103 are arranged side by side in the axial direction. Planetary carrier 192 and planetary gear 193 are rotatable relative to each other. Further, low-speed shaft 194, mid-speed shaft 196, and high-speed shaft 198 are rotatably supported by roller bearings 103, 103 relative to housings 199, 199 disposed opposite to their outer circumferential surfaces.

Next, operations of step-up gear box 154 will be described. Referring to FIG. 10, when blade 152 of wind turbine generator 150 catches wind and is rotated, main shaft 151 is rotated. Referring to FIG. 10 and FIG. 14, input shaft 191, connected to main shaft 151, is rotated according to the rotation of blade 152. Referring to FIG. 14, when input shaft 191 is rotated, planetary carrier 192 is revolved in a space between low-speed shaft 194 and outer ring gear 190 disposed to surround low-speed shaft 194. In response to this movement of planetary carrier 192, planetary gear 193 is rotated on its axis and is revolved around low-speed shaft 194 while gear portion 193A of planetary gear 193 is engaged with both gear portion 190A of outer ring gear 190 and gear portion 194A of low-speed shaft 194. As a result, low-speed shaft 194 is rotated around its axis according to a relation between the number of teeth of gear portion 190A of outer ring gear 190 and the number of teeth of gear portion 194A of low-speed shaft 194.

When low-speed shaft 194 is rotated, low-speed gear 195 is rotated together with low-speed shaft 194, which causes rotation of mid-speed shaft 196 having gear portion 196A engaged with gear portion 195A of low-speed gear 195. On this occasion, the rotation of low-speed shaft 194 is speeded up according to a speed-up ratio corresponding to a ratio of the number of teeth of gear portion 195A of low-speed gear 195 to the number of teeth of gear portion 196A of mid-speed shaft 196, and is transmitted to mid-speed shaft 196. Further, when mid-speed shaft 196 is rotated, mid-speed gear 197 is rotated together with mid-speed shaft 196, which causes rotation of high-speed shaft 198 having gear portion 198A engaged with gear portion 197A of mid-speed gear 197. On this occasion, the rotation of mid-speed shaft 196 is speeded up according to a speed-up ratio corresponding to a ratio of the number of teeth of gear portion 197A of mid-speed gear 197 to the number of teeth of gear portion 198A of high-speed shaft 198, and is transmitted to high-speed shaft 198.

As described above, referring to FIG. 10 and FIG. 14, rotation of main shaft 151 is speeded up by step-up gear box 154 and is output to cause rotation of output shaft 155 connected to high-speed shaft 198.

Namely, each of roller bearings 103, each of which is a step-up gear box bearing and serves as a rolling bearing for a wind turbine generator in the fifth embodiment, is a roller bearing used for a wind turbine generator and adapted to rotatably support input shaft 191, planetary carrier 192, planetary gear 193, low-speed shaft 194, mid-speed shaft 196, or high-speed shaft 198, each of which is a rotation member rotating according to rotation of main shaft 151 of the windmill for the wind turbine generator, relative to the members disposed opposite thereto (housings 199, planetary carrier 192, planetary gear 193).

In other words, roller bearing 103 of the fifth embodiment is a step-up gear box bearing adapted to rotatably support a rotation member, which is rotated in the inner portion of step-up gear box 154, relative to a member disposed opposite to the rotation member.

Further, roller bearing 103 that is a step-up gear box bearing has the same configuration as that of main shaft bearing 101 described with reference to FIG. 10-FIG. 12, and provides a similar advantage. Namely, the outer ring, the inner ring, and the roller each serving as a rolling contact member used for a step-up gear box and constituting cylindrical roller bearing 103 for the step-up gear box (rolling contact member of a rolling bearing for a wind turbine generator) respectively correspond to outer ring 111, inner ring 112, and roller 113 of main shaft bearing 101, and have similar inner portions, high density layers, and higher density layers. Hence, roller bearing 103 serving as a step-up gear box bearing in the present embodiment is a rolling bearing used for a wind turbine generator and including a rolling contact member formed of β-sialon sintered body inexpensive, capable of reliably ensuring sufficient durability, and capable of reducing and preventing damage when a great load is imposed abruptly.

It should be noted that, roller bearing 103, which is a step-up gear box bearing serving as a rolling bearing for a wind turbine generator, as well as the outer ring, the inner ring, and the roller each provided therein and serving as a rolling contact member for the step-up gear box in the fifth embodiment can be produced in a way similar to that in the first embodiment.

As exemplary rolling bearings and rolling contact members of the present invention, the embodiments described above provide the deep-grooved ball bearing, the thrust needle roller bearing, and the hub unit, as well as the rolling contact members provided therein, but the rolling bearings of the present invention are not limited to these. For example, the race member may be a shaft or plate used to allow a rolling element to roll on the surface thereof. In other words, the race member, which is a rolling contact member of the present invention, may be any member having a raceway surface on which a rolling element rolls. In addition, the rolling bearing of the present invention may be a thrust ball bearing or a radial roller bearing.

Further, as exemplary rolling bearings for a wind turbine generator and rolling contact members of such rolling bearings for a wind turbine generator in the present invention, the embodiments described above provide the main shaft bearings (double row self-aligning roller bearings), the power generator bearings (deep-grooved ball bearings), and the bearings for a step-up gear box (roller bearings) as well as rolling contact members provided therein and used for the rolling bearings for a wind turbine generator. However, the rolling bearings for a wind turbine generator and the rolling contact members of such rolling bearings for a wind turbine generator in the present invention are not limited to these. For example, the race member may be a shaft or plate used to allow a rolling element to roll on the surface thereof. In other words, the race member, which is a rolling contact member of a rolling bearing for a wind turbine generator in the present invention, may be any member having a raceway surface on which a rolling element rolls. Further, the rolling bearings for a wind turbine generator in the present invention may be roller bearings such as conical roller bearings, cylindrical roller bearings, double row cylindrical roller bearings, double row conical roller bearings, self-aligning roller bearings, and full complement cylindrical roller bearings, or ball bearings such as angular ball bearings and four-point contact ball bearings.

Further, the above-described embodiments deal with a case where each of the race member and the rolling element in each rolling bearing of the present invention corresponds to the rolling contact member formed of β-sialon sintered body in the present invention, but the rolling bearing of the present invention is not limited to this. In the rolling bearing of the present invention, at least one of the race member and the rolling element may correspond to the rolling contact member of the present invention. Where one of the race member and the rolling element corresponds to the rolling contact member of the present invention, it is preferable that the rolling element correspond to the rolling contact member of the present invention, in consideration of production cost of the rolling bearing.

In this case, the material for the race member of the rolling bearing of the present invention is not particularly limited. Examples usable therefor are steel, specifically, bearing steel such as SUJ2 of the JIS Standard, or case hardening steel such as SCR420 or SCM420. Alternatively, ceramics such as silicon nitride may be employed for the material for the race member of the rolling bearing of the present invention.

Further, the rolling contact member and the rolling bearing of the present invention are particularly suitable as a rolling contact member and a rolling bearing both used in an environment in which an imposed load is abruptly changed. Specifically, the rolling contact member and the rolling bearing of the present invention are particularly suitable as, for example, the above-described rolling contact member for a hub unit and the hub unit including the rolling contact member; a rolling contact member used for a bearing for an electric tool to rotatably support a spindle of the electric tool relative to a member disposed opposite to the spindle, and the bearing used for the electric tool and including the rolling contact member; a rolling contact member for a touch-down bearing for a magnetic bearing apparatus in which a bearing ring is disposed opposite to a rotation member supported by a magnetic bearing, and the touch-down bearing used for the magnetic bearing apparatus and including the rolling contact member for the touch-down bearing; a rolling contact member used for a bearing for a windmill to rotatably support a main shaft of the windmill or a rotation member, which rotates according to rotation of the main shaft, relative to a member disposed opposite to the main shaft or the rotation member, and the bearing used for the windmill and provided in the rolling contact member for the windmill.

Example 1

Hereinafter, an example 1 of the present invention will be described. For a relation between a z value and rolling contact fatigue life (durability), a test was conducted to inspect rolling bearings fabricated to have rolling elements formed of β-sialon sintered bodies having various z values. The test was conducted in the following procedure.

Explained first is a method for fabricating the test bearings subjected to the test. Initially, combustion synthesis was employed to prepare powdery β-sialon having a z value falling within the range of 0.1 to 4. From the powdery β-sialon, a rolling contact member having a z value falling within the range from 0.1 to 4 was fabricated using a method basically similar to that of producing a rolling contact member as described in the first embodiment with reference to FIG. 7. More specifically, it was produced in a method, as follows. Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) were wet-mixed using a ball mill. Subsequently, a spray dryer is used to granulate the intermediate product to produce granulated powder. The granulated powder was introduced in a die and thus shaped in the form of sphere, and furthermore, a cold isostatical press (CIP) was employed to apply pressure to obtain a spherically shaped body.

Then the shaped body was subjected to pressureless sintering as primary sintering and was thereafter subjected to HIP (Hot Isostatic Press) in an atmosphere of nitrogen at a pressure of 200 MP to produce sintered spherical body. Then the sintered spherical body is lapped to be a ⅜ inch ceramic ball (HS grade: G5). It was then combined with a separately prepared bearing ring of bearing steel (JIS SUJ2) to produce a bearing of JIS type number 6206 (examples A-H and comparative examples B and C). For comparison, a rolling element formed of silicon nitride, i.e., a rolling element having a z value of 0 was also fabricated using a method similar to that of producing a rolling element formed of β-sialon, and was similarly incorporated into a bearing (comparative example A).

The test was conducted in the following conditions: A bearing of JIS type number 6206 produced as described above underwent a fatigue test such that it experienced a maximum contact pressure Pmax of 3.2 GPa and was rotated at 2000 rpm, using a lubricant of turbine oil VG68 (clean oil) circularly fed, and thus tested at room temperature. A vibration detector was employed to monitor how the bearing in operation vibrates, and after the bearing had a rolling element damaged when the bearing's vibration exceeds a predetermined value, the test was stopped, and a period of time having elapsed since the bearing started to operate until the test was stopped was recorded as the bearing's life. After the stop of test, the bearing was disassembled to confirm the damaged condition of the rolling contact member.

rolling element formed of a β-sialon sintered body inexpensive and capable of reliably ensuring sufficient durability.

Referring to table 1, in example H in which the z value was more than 3, specifically, was 3.5, the rolling element was slightly worn. In addition, example H provided life shorter than those of examples A-G. Hence, it can be said that the z value is desirably set at 3 or smaller to ensure sufficient durability more reliably.

According to the result of the test, in order to achieve durability (life) equivalent to or better than that of the rolling element formed of silicon nitride, the z value is preferably set at 2 or smaller, more preferably at 1.5 or smaller. For easiness of fabrication of powdery β-sialon using a production process employing combustion synthesis, it is preferable to set the z value at 0.5 or greater because reaction by self-heating can be expected sufficiently with such a z value.

TABLE 1

|  | Comp. Ex. A | Ex. A | Ex. B | Ex. C | Ex. D | Ex. E | Ex. F | Ex. G | Ex. H | Comp. Ex. B | Comp. Ex. C |
|---|---|---|---|---|---|---|---|---|---|---|---|
| Z value | 0 (silicon nitride) | 0.1 | 0.5 | 1 | 1.5 | 2 | 2.5 | 3 | 3.5 | 3.8 | 4 |
| Life ratio | 1 | 1.05 | 1.05 | 1.05 | 1.01 | 0.99 | 0.95 | 0.9 | 0.74 | 0.12 | <0.05 |
| Type of damage | flaking | flaking | flaking | flaking | flaking | flaking | flaking | flaking | flaking (slightly worn) | flaking (worn) | worn |

Table 1 shows results of the test in the present example. In table 1, each life of the examples and the comparative examples is presented with a ratio of life, assuming the life of comparative example A (silicon nitride) as 1. Types of damage described therein are "flaking" and "worn". The "flaking" represents a case where flakes came off from a surface of a rolling element, whereas the "worn" represents a case where the surface was worn without generation of flakes and the test was stopped.

Referring to table 1, examples A-H of the present invention each having a z value of 0.1 or greater but 3.5 or smaller achieved lives as good as that of the one formed of silicon nitride (comparative example A). The type of damage for them was "flaking" as with the one formed of silicon nitride. In contrast, comparative example B, in which the z value exceeds 3.5 to fall out of the range of the present invention, provided a drastically decreased life and it was observed that the rolling element thereof was worn. In other words, it is considered that in comparative example B in which the z value was 3.8, the rolling element was worn to provide a drastically decreased life although flakes were generated in the rolling element thereof in the end. Further, in comparative example C in which the z value was 4, the rolling element was worn in a very short period of time, resulting in drastically decreased durability of the rolling bearing.

As described above, each rolling bearing having a rolling element constituted by a sialon sintered body having a z value of 0.1 or greater but 3.5 or smaller has durability substantially equivalent to that of a rolling bearing having a rolling element constituted by a sintered body formed of silicon nitride. In contrast, when the z value exceeds 3.5, the rolling element is likely to be worn, resulting in a decreased rolling contact fatigue life. Further, when the z value is larger, the types of damage of the rolling element formed of β-sialon is changed from "flaking" to "worn", thus apparently resulting in a drastically decreased rolling contact fatigue life. As such, it was confirmed that when the z value is set at 0.1 or greater but 3.5 or smaller, there can be provided a rolling bearing including a Example 2

Hereinafter an example 2 of the present invention will be described. A test was conducted to inspect how the rolling contact member of the present invention has a high density layer and a higher density layer formed, as seen in cross section. The test was conducted in the following procedure.

Initially, combustion synthesis was employed to prepare powdery β-sialon (product name: Meramix, produced by Isman J Corporation) having a composition of $Si_5AlON_7$, and therefrom a specimen in the form of a cube having each side of approximately 10 mm was produced in a method similar to that of producing a rolling contact member as described in the first embodiment with reference to FIG. 7. More specifically, it was produced in a method, as follows. Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) were wet-mixed using a ball mill. Subsequently, a spray dryer was used to granulate the intermediate product to produce granulated powder. The granulated powder was introduced in a die and thus shaped to have a predetermined geometry, and furthermore, a cold isostatical press (CIP) was employed to apply pressure to obtain a shaped body. Subsequently the shaped body was heated to 1650° C. in an atmosphere of nitrogen of a pressure of 0.4 MPa and thus sintered to produce the above cubic specimen.

Subsequently, the specimen was cut and the cut surface was lapped with a diamond lap and thereafter mirror-lapped with a chromium oxide lap to obtain a cross section including a center of the cube for observation. The cross section was observed with an optical microscope (Microphoto-FXA produced by Nikon Corporation) with oblique illumination and imaged in an instant photograph (FP-100B produced by FUJIFILM Corporation) of a magnification of 50 times. Subsequently, the obtained photograph's image was taken in via a scanner (with a resolution of 300 dpi) to a personal computer. Image processing software (WinROOF produced by Mitani Corporation) was used to perform a binarization process by a brightness threshold value (in the present example, a binarizing separation threshold value: 140) to measure a white color portion for an area ratio.

The test provides a result, as described hereinafter. Note that FIG. 15 shows a photograph having an upper side showing a side of a specimen that is closer to a surface thereof, and a top end corresponding to the surface.

Figure 15:
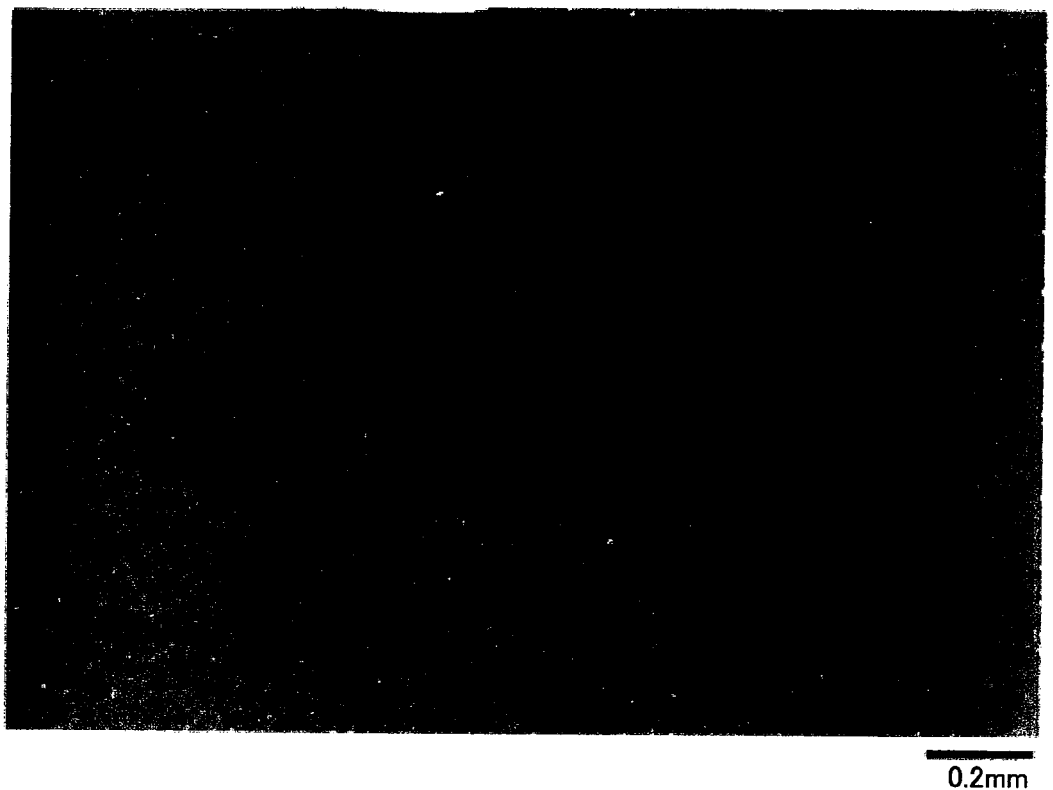
FIG. 15 is a photograph of a specimen for observation in cross section, as shot via an optical microscope with oblique illumination.
Figure 16:
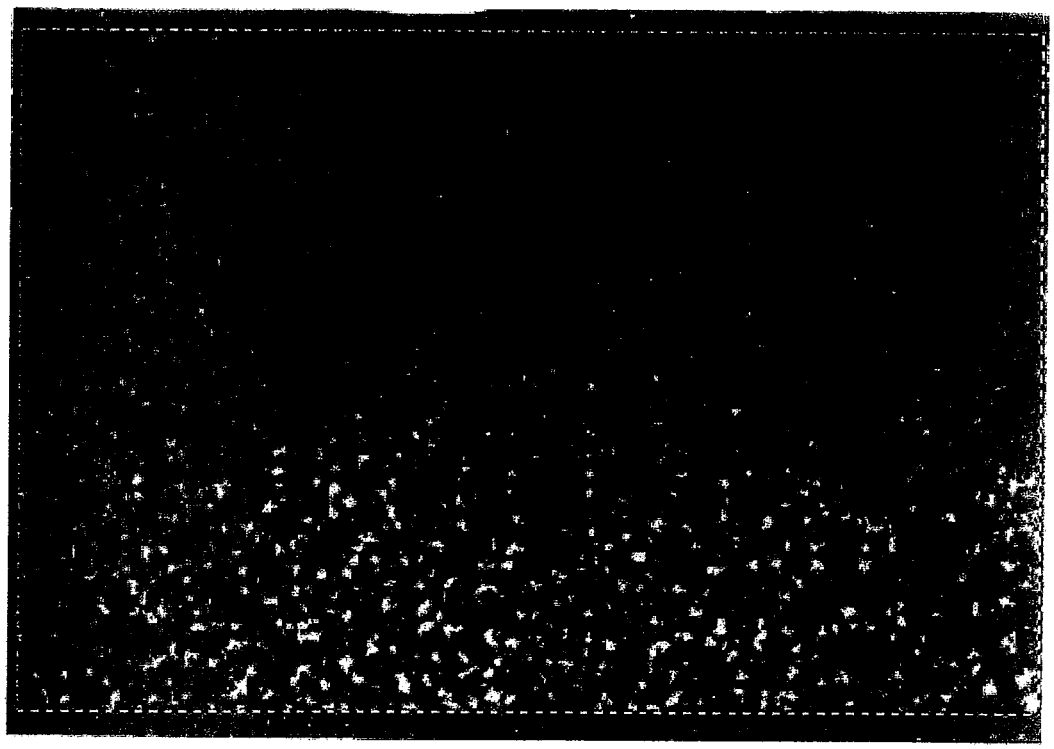
FIG. 16 shows one example of binarizing the photographic image of FIG. 15 by a brightness threshold value using image processing software.
Figure 17:
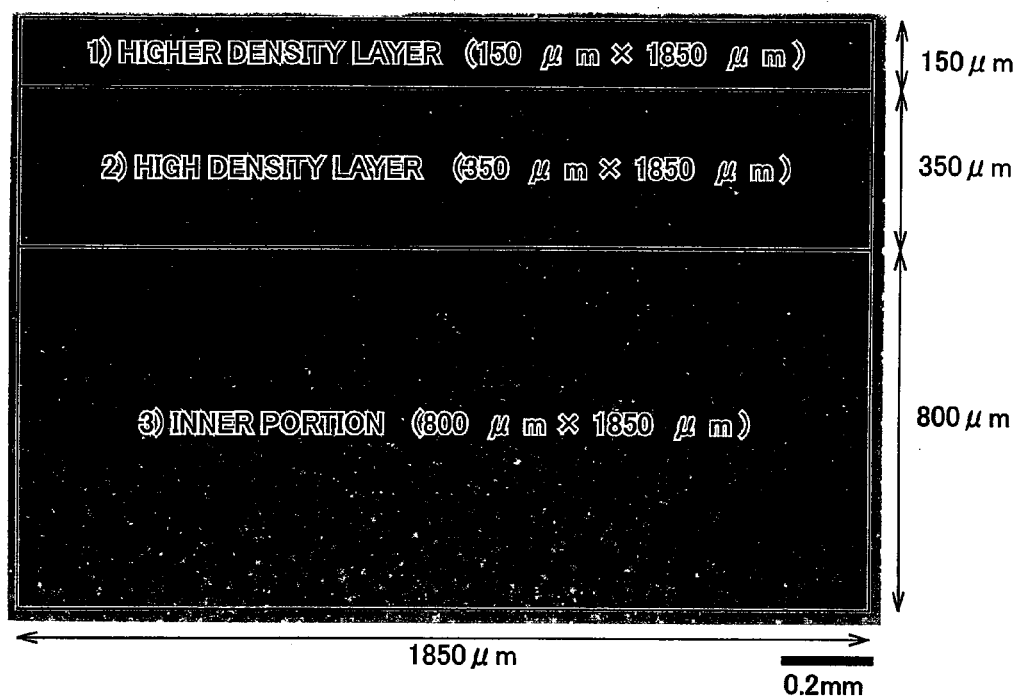
FIG. 17 shows a region subjected to an image process (a region to be evaluated) in binarizing the photographic image of FIG. 15 by the brightness threshold value using the image processing software upon measuring an area ratio of a white color portion.

With reference to FIG. 15 and FIG. 16, it can be seen that a specimen in the present example produced in a method similar to that of producing the present rolling contact member of the present invention had in a portion including a surface a layer having a white color portion less than an inner portion did, and as shown in FIG. 17, a shot photograph's image was divided in accordance with a distance from an outermost surface of the specimen into three regions (i.e., a region from the outermost surface to a depth of 150 μm, a region that exceeds 150 μm and does not exceed 500 μm, and a region that exceeds 500 μm and does not exceed 800 μm), and each region was subjected to image analysis to calculate a white color portion for area ratio. A result shown in table 2 was obtained. In table 2, each region shown in FIG. 17 serves as one field of view, and from five randomly shot photographs, five fields of view were obtained. For each field, a white color portion was measured for area ratio, and their average and maximum values were indicated.

TABLE 2

| | Depth from Outermost Surface (μm) | Area Ratio of White Color Portion (%) | |
|---|---|---|---|
| | | Ave. of 5 Fields of View | Max. of 5 Fields of View |
| 1) Higher Density Layer | 150 | 1.2 | 3.5 |
| 2) High Density Layer | 150-500 | 3.7 | 7.0 |
| 3) Inner Portion | >500 | 18.5 | 22.4 |

With reference to table 2, the present example provided a white color portion having an area ratio of 18.5% for an inner portion, and, in contrast, 3.7% for the region having a depth equal to or smaller than 500 μm from a surface, and 1.2% for the region having a depth equal to or smaller than 150 μm from the surface. It has been confirmed therefrom that a specimen produced in the present example in a method similar to that of producing the rolling contact member of the present invention had in a portion including a surface a high density layer and a higher density layer having a white color portion less than an inner portion did.

Example 3

Hereinafter an example 3 of the present invention will be described. A test was conducted to confirm rolling contact fatigue life of the rolling contact member of the present invention. The test was conducted in the following procedure.

Explained first is a method for fabricating test bearings subjected to the test. Initially, combustion synthesis was employed to prepare powdery β-sialon (product name: Meramix, produced by Isman J Corporation) having a composition of $Si_5AlON_7$, and therefrom a ⅜ inch ceramic ball having a diameter of 9.525 mm was produced in a method similar to that of producing a rolling contact member, as described in the first embodiment with reference to FIG. 7. More specifically, it is produced in a method, as follows. Initially, powder of β-sialon in the form of fine, submicron grains and a sintering additive of aluminum oxide (AKP30 produced by Sumitomo Chemical Co., Ltd) and yttrium oxide (yttrium oxide grade C produced by H. C. Starck) were wet-mixed using a ball mill. Subsequently, a spray dryer was used to granulate the intermediate product to produce granulated powder. The granulated powder was introduced in a die and thus shaped to be a sphere, and furthermore, a cold isostatical press (CIP) was employed to apply pressure to obtain a spherically shaped body.

Then the shaped body was subjected to green body forming so that after it was sintered it had a predetermined working thickness. Subsequently the shaped body was heated to 1650° C. in an atmosphere of nitrogen at a pressure of 0.4 MPa and thus sintered to produce a sintered spherical body. Then the sintered spherical body was lapped to be a ⅜ inch ceramic ball (a rolling element; JIS grade: G5). It was then combined with a separately prepared bearing ring of bearing steel (JIS SUJ2) to produce a bearing of JIS type number 6206. Herein, the sintered spherical body was lapped to have a thickness (or a working thickness) removed in 8 levels to produce 8 types of bearings (examples A-H). In contrast, for comparison, silicon nitride and a sintering additive were used to provide a powdery source material which was in turn pressure-sintered to provide a sintered spherical body (EC141 produced by NGK Spark Plug Co. Ltd.) which was in turn lapped, similarly as described above, and combined with a separately prepared bearing ring of bearing steel (JIS SUJ2) to produce a bearing of JIS type number 6206 (comparative example A). It was lapped by a thickness of 0.25 mm.

The test was conducted in the following conditions. A bearing of JIS type number 6206 produced as described above underwent a fatigue test such that it experienced a maximum contact pressure Pmax of 3.2 GPa and was rotated at 2000 rpm, using a lubricant of turbine oil VG68 (clean oil) circularly fed, and thus tested at room temperature. A vibration detector was employed to monitor how the bearing in operation vibrated, and after the bearing had a rolling element damaged when the bearing's vibration exceeded a predetermined value, the test was stopped, and a period of time having elapsed since the bearing started to operate until the test was stopped was recorded as the bearing's life. Note that 15 bearings for each example of the present invention and the comparative example were tested and their $L_{10}$ lives were calculated and evaluated for durability by a life ratio in comparison with comparative example A.

TABLE 3

| | Working Thickness (mm) | $L_{10}$ Life (Hours) | Life Ratio |
|---|---|---|---|
| Ex. A | 0.05 | 6492 | 3.19 |
| Ex. B | 0.10 | 6387 | 3.14 |
| Ex. C | 0.15 | 6404 | 3.15 |
| Ex. D | 0.20 | 3985 | 1.96 |
| Ex. E | 0.30 | 4048 | 1.99 |
| Ex. F | 0.40 | 3945 | 1.94 |
| Ex. G | 0.50 | 3069 | 1.51 |
| Ex. H | 0.60 | 867 | 0.43 |
| Comp. Ex. A | 0.25 | 2036 | 1.00 |

Table 3 shows a result of testing the present example. With reference to table 3, it can be said that the present example provides bearings all having satisfactory lives with their production costs and the like considered. A working thickness set to be equal to or smaller than 0.5 mm to provide a rolling element having a surface with a high density layer remaining therein, i.e., the present invention in examples D-G, provides a bearing having a life approximately 1.5-2 times that of comparative example A. Furthermore, a working thickness set to be equal to or smaller than 0.15 mm to provide a rolling element having a surface with a higher density layer remaining therein, i.e., the present invention in examples A-C, provides a bearing having a life approximately 3 times that of comparative example A. It is thus confirmed that a rolling bearing including the present rolling contact member is excellent in durability, and it has been found that a rolling bearing including the present rolling contact member with a working thickness set to be equal to or smaller than 0.5 mm to have a surface with a high density layer remaining therein can have an increased life and a rolling bearing including the present rolling contact member with a working thickness set to be equal to or smaller than 0.15 mm to have a surface with a higher density layer remaining therein can have a further increased life.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

A rolling contact member and a rolling bearing of the present invention are advantageously applicable particularly to a rolling contact member formed of a sintered body containing β-sialon as a main component and a rolling bearing including the rolling contact member.

The invention claimed is:

1. A rolling contact member in a rolling bearing, the rolling contact member being one of a race member and a rolling element disposed in contact with said race member on an annular raceway,
   the rolling contact member being formed of a sintered body that contains as a main component β-sialon represented by a compositional formula of $Si_{6-z}Al_zO_zN_{8-z}$ and satisfying $0.1 \leq z \leq 3.5$ and that has a remainder formed of an impurity,
   the rolling contact member having a Young's modulus of 180 GPa or greater but 270 GPa or smaller,
   wherein the rolling contact member has a rolling contact surface serving as a surface contacting another rolling contact member, said rolling contact surface being included in a portion having a high density layer higher in density than an inner portion, and
   said high density layer has a surface included in a portion having a higher density layer higher in density than another portion of said high density layer.

2. The rolling contact member according to claim 1, wherein when said high density layer is observed in cross section with an optical microscope with oblique illumination, said layer exhibits a portion observed as a portion white in color having an area ratio equal to or smaller than 7%.

3. The rolling contact member according to claim 1, wherein when said higher density layer is observed in cross section with an optical microscope with oblique illumination, said layer exhibits a portion observed as a portion white in color having an area ratio equal to or smaller than 3.5%.

4. The rolling contact member according to claim 1, wherein said rolling bearing is a rolling bearing, used for a wind turbine generator, for rotatably supporting one of a main shaft of a windmill for the wind turbine generator and a rotation member, which is rotated according to rotation of said main shaft, relative to a member disposed opposite to one of said main shaft and said rotation member.

5. A rolling bearing comprising:
   a race member; and
   a plurality of rolling elements disposed in contact with said race member on an annular raceway,
   at least one of said race member and said rolling element being the rolling contact member of claim 1.

6. A rolling contact member in a rolling bearing, the rolling contact member being one of a race member and a rolling element disposed in contact with said race member on an annular raceway,
   the rolling contact member being formed of a sintered body that contains as a main component β-sialon represented by a compositional formula of $Si_{6-z}Al_zO_zN_{8-z}$ and satisfying $0.1 \leq z \leq 3.5$ and that has a remainder formed of a sintering additive and an impurity,
   the rolling contact member having a Young's modulus of 180 GPa or greater but 270 GPa or smaller,
   wherein the rolling contact member has a rolling contact surface serving as a surface contacting another rolling contact member, said rolling contact surface being included in a portion having a high density layer higher in density than an inner portion, and
   said high density layer has a surface included in a portion having a higher density layer higher in density than another portion of said high density layer.

7. The rolling contact member according to claim 6, wherein when said high density layer is observed in cross section with an optical microscope with oblique illumination, said layer exhibits a portion observed as a portion white in color having an area ratio equal to or smaller than 7%.

8. The rolling contact member according to claim 6, wherein when said higher density layer is observed in cross section with an optical microscope with oblique illumination, said layer exhibits a portion observed as a portion white in color having an area ratio equal to or smaller than 3.5%.

9. The rolling contact member according to claim 6, wherein said rolling bearing is a rolling bearing, used for a wind turbine generator, for rotatably supporting one of a main shaft of a windmill for the wind turbine generator and a rotation member, which is rotated according to rotation of said main shaft, relative to a member disposed opposite to one of said main shaft and said rotation member.

10. A rolling bearing comprising:
    a race member; and
    a plurality of rolling elements disposed in contact with said race member on an annular raceway,
    at least one of said race member and said rolling element being the rolling contact member of claim 6.

* * * * *